(12) United States Patent
Stern-Berkowitz et al.

(10) Patent No.: US 11,818,073 B2
(45) Date of Patent: Nov. 14, 2023

(54) METHODS, APPARATUS, SYSTEMS AND PROCEDURES FOR SUPPORTING MULTICAST TRANSMISSION

(71) Applicant: InterDigital Patent Holdings, Inc., Wilmington, DE (US)

(72) Inventors: Janet A Stern-Berkowitz, Little Neck, NY (US); Moon-il Lee, Melville, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/350,844

(22) Filed: Jun. 17, 2021

(65) Prior Publication Data
US 2021/0314127 A1 Oct. 7, 2021

Related U.S. Application Data

(63) Continuation of application No. 16/301,647, filed as application No. PCT/US2017/033459 on May 19, 2017, now Pat. No. 11,075,737.
(Continued)

(51) Int. Cl.
*G01R 31/28* (2006.01)
*H04L 5/00* (2006.01)
(Continued)

(52) U.S. Cl.
CPC .......... *H04L 5/0055* (2013.01); *H04L 1/0046* (2013.01); *H04L 1/08* (2013.01);
(Continued)

(58) Field of Classification Search
CPC ....... H04L 1/0046; H04L 1/08; H04L 1/1607; H04L 1/1642; H04L 1/1822;
(Continued)

(56) References Cited

U.S. PATENT DOCUMENTS 8,565,212 B2 10/2013 Zhang et al.
8,811,961 B2 * 8/2014 Lee .................. H04W 4/70
455/426.2
(Continued)

FOREIGN PATENT DOCUMENTS

CN 1852551 A 10/2006
CN 101507300 A 8/2009
(Continued)

OTHER PUBLICATIONS

S. Kim, K. Jung, J. Choi and Y. Kwak, "Improving LTE/LTE-A UE Power Efficiency with Extended DRX Cycle," 2014 IEEE 80th Vehicular Technology Conference (VTC2014-Fall), Vancouver, BC, Canada, 2014, pp. 1-5, doi: 10.1109/VTCFall.2014.6966009. (Year: 2014).*
(Continued)

*Primary Examiner* — Albert Decady
*Assistant Examiner* — Enamul M Kabir
(74) *Attorney, Agent, or Firm* — Majid Albassam

(57) ABSTRACT

Methods, apparatus, systems and procedures to manage a multicast communication to a multicast group implemented by a respective wireless transmit/receive unit (WTRU) of WTRUs in the multicast group are disclosed. One representative method includes receiving, by the respective WTRU of the multicast group, a configuration, the configuration indicating a Random Access Channel (RACH) preamble to use for a negative acknowledgement (NACK) response to a multicast transmission to the respective WTRU, monitoring, by the respective WTRU, for data of the multicast transmission, determining, by the respective WTRU, whether the monitored for data was successfully received; and on condition that the monitored for data was not successfully received, sending, by the respective WTRU, the RACH preamble indicated by the received configuration.

22 Claims, 11 Drawing Sheets

Related U.S. Application Data

(60) Provisional application No. 62/454,297, filed on Feb. 3, 2017, provisional application No. 62/416,410, filed on Nov. 2, 2016, provisional application No. 62/376,981, filed on Aug. 19, 2016, provisional application No. 62/339,565, filed on May 20, 2016.

(51) Int. Cl.
| | |
|---|---|
| *H04L 1/00* | (2006.01) |
| *H04L 1/08* | (2006.01) |
| *H04L 1/1607* | (2023.01) |
| *H04L 1/1822* | (2023.01) |
| *H04L 12/18* | (2006.01) |
| *H04W 74/08* | (2009.01) |

(52) U.S. Cl.
CPC .......... *H04L 1/1642* (2013.01); *H04L 1/1822* (2013.01); *H04L 5/0053* (2013.01); *H04L 5/0094* (2013.01); *H04L 12/189* (2013.01); *H04L 12/1868* (2013.01); *H04W 74/0833* (2013.01)

(58) Field of Classification Search
CPC . H04L 12/1868; H04L 12/189; H04L 5/0053; H04L 5/0055; H04L 5/0094; H04W 4/06; H04W 74/0833; H04W 76/19; H04W 76/27; H04W 76/40
See application file for complete search history.

(56) References Cited

U.S. PATENT DOCUMENTS

| | | | |
|---|---|---|---|
| 9,491,743 | B2 | 11/2016 | Yang et al. |
| 10,111,190 | B2 | 10/2018 | Pelletier et al. |
| 11,006,361 | B2* | 5/2021 | Ramle ............... H04W 4/70 |
| 11,075,737 | B2 | 7/2021 | Stern-Berkowitz et al. |
| 2008/0045228 | A1 | 2/2008 | Chandra et al. |
| 2009/0248886 | A1 | 10/2009 | Tan et al. |
| 2009/0268676 | A1 | 10/2009 | Wigard et al. |
| 2010/0272037 | A1* | 10/2010 | Lee ............... H04W 52/0235 |
| | | | 370/329 |
| 2010/0322136 | A1 | 12/2010 | Kanazawa et al. |
| 2012/0044851 | A1 | 2/2012 | Wang et al. |
| 2012/0147830 | A1 | 6/2012 | Loehr et al. |
| 2013/0028184 | A1* | 1/2013 | Lee ................ H04W 48/02 |
| | | | 370/328 |
| 2013/0272148 | A1* | 10/2013 | Fong ............... H04W 76/10 |
| | | | 370/312 |
| 2013/0294320 | A1 | 11/2013 | Jactat et al. |
| 2014/0105165 | A1 | 4/2014 | Dinan |
| 2014/0358866 | A1 | 12/2014 | Gholmieh et al. |
| 2015/0016312 | A1 | 1/2015 | Li et al. |
| 2015/0085735 | A1 | 3/2015 | Shelby et al. |
| 2015/0230228 | A1 | 8/2015 | Zhang et al. |
| 2015/0264667 | A1* | 9/2015 | Lee ..................... H04L 5/001 |
| | | | 370/329 |
| 2015/0282119 | A1 | 10/2015 | Mcevilly |
| 2015/0358986 | A1 | 12/2015 | Yang et al. |
| 2016/0044634 | A1* | 2/2016 | Seo .................. H04W 76/14 |
| | | | 370/312 |
| 2016/0119762 | A1* | 4/2016 | Zhu .................. H04B 7/0456 |
| | | | 370/312 |
| 2016/0135143 | A1* | 5/2016 | Won ................ H04W 52/243 |
| | | | 370/312 |
| 2016/0192376 | A1 | 6/2016 | Lee et al. |
| 2016/0205662 | A1 | 7/2016 | Cormier et al. |
| 2016/0278053 | A1* | 9/2016 | Lee ..................... H04L 5/00 |
| 2017/0295005 | A1 | 10/2017 | Lee et al. |
| 2018/0152274 | A1 | 5/2018 | Li et al. |
| 2018/0212736 | A1* | 7/2018 | Chatterjee ............ H04W 48/12 |

FOREIGN PATENT DOCUMENTS

| | | |
|---|---|---|
| CN | 102301751 A | 12/2011 |
| CN | 103202040 A | 7/2013 |
| CN | 104641664 A | 5/2015 |
| CN | 105247904 A | 1/2016 |
| EP | 1631110 A1 | 3/2006 |
| EP | 2242306 | 10/2010 |
| WO | WO 2007091831 A3 | 12/2008 |
| WO | WO 2014039850 A1 | 3/2014 |
| WO | WO 2016/025836 | 2/2016 |
| WO | WO 2016/182220 | 11/2016 |
| WO | WO 2017/015836 | 2/2017 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321 V13.1.0, Mar. 2016, 85 pages.

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.5.0, Mar. 2015, 445 pages.

LG Electronics, "Discussion on UE feedback for DL multicast/broadcast", 3GPP Tdoc R1-164537; 3GPP TSG RAN WG1 Meeting #85, Nanjing, China, May 23-27, 2016, 5 pages.

* cited by examiner

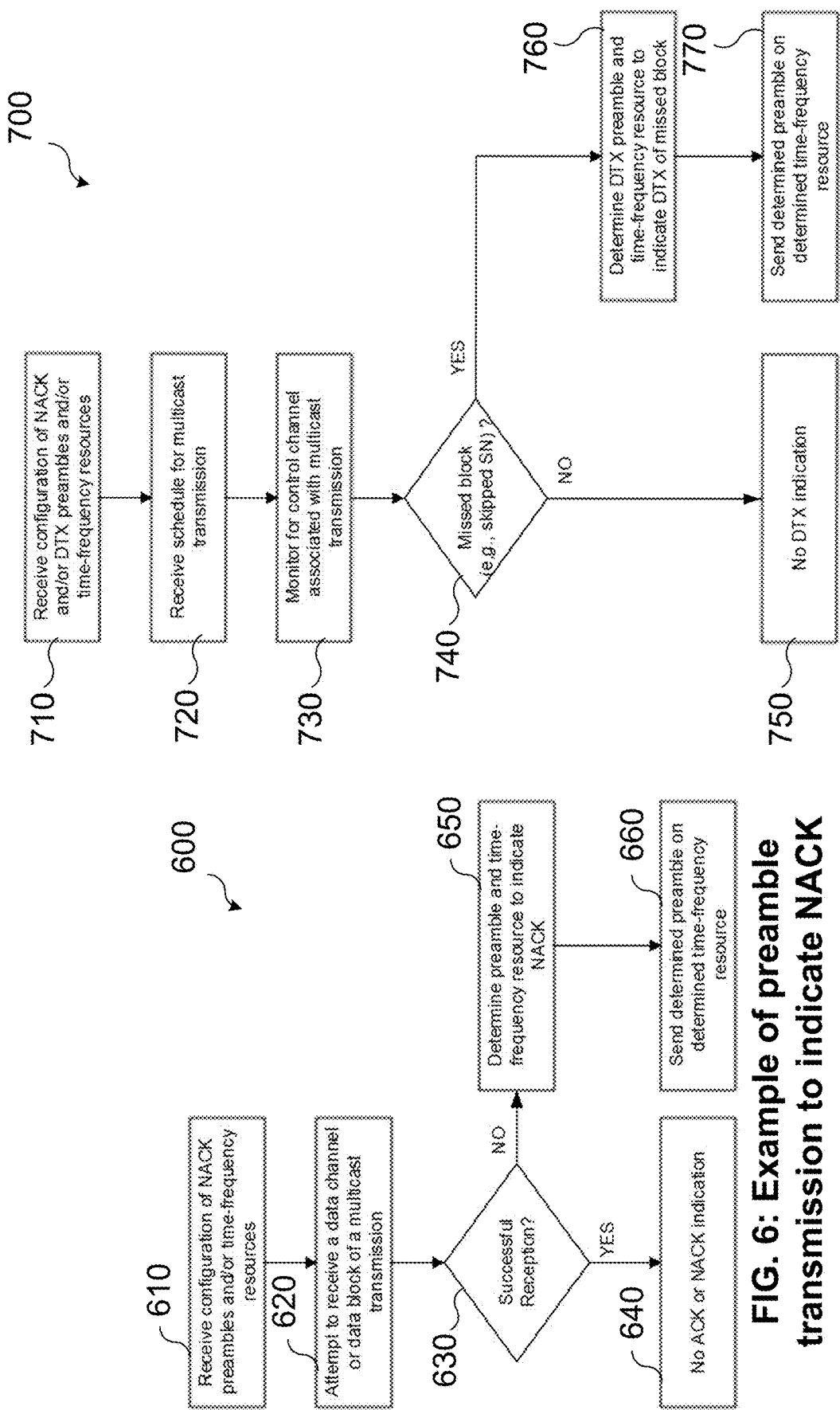
FIG. 6: Example of preamble transmission to indicate NACK
FIG. 7: Example of preamble transmission to indicate DTX

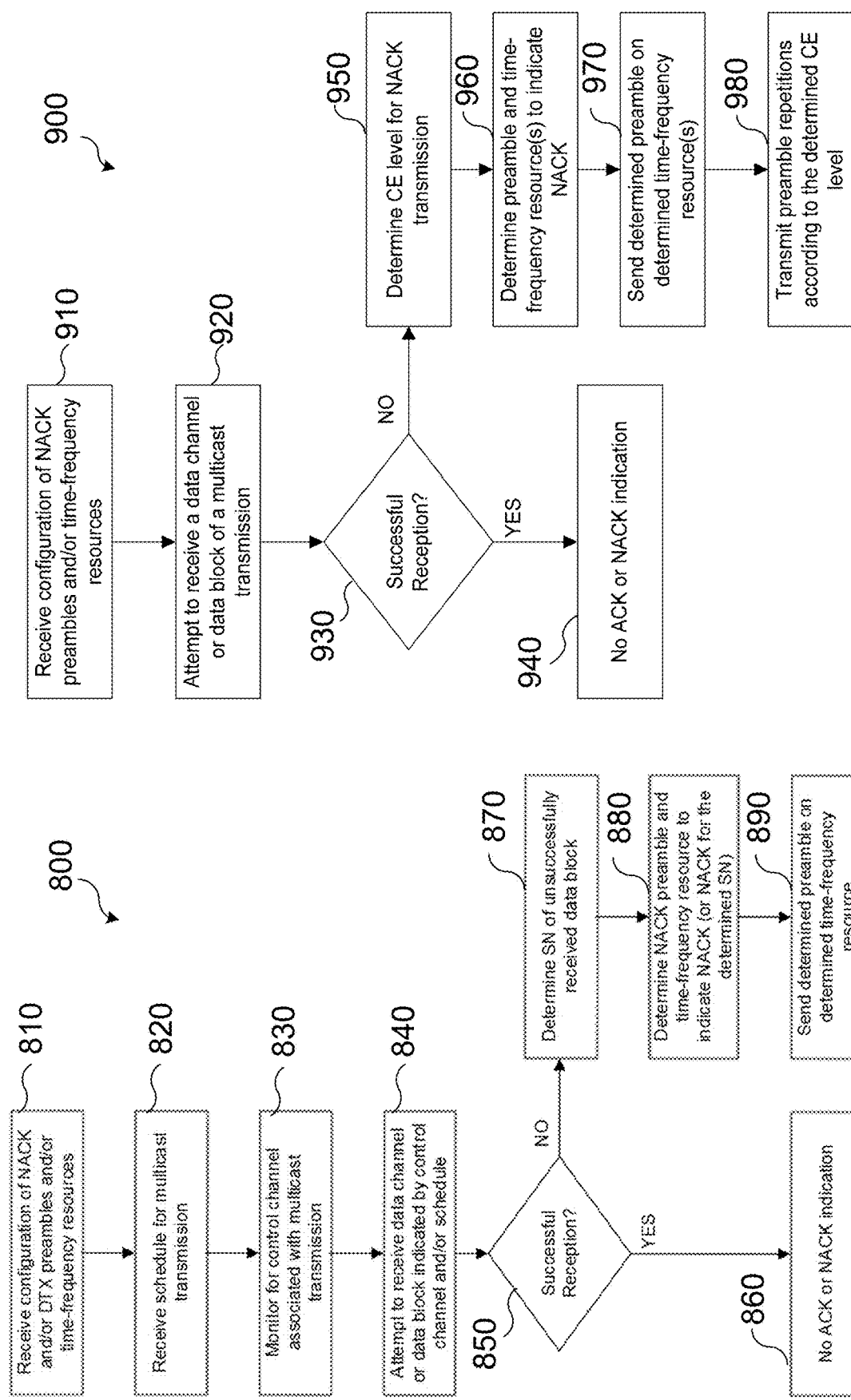
FIG. 8: Another example of preamble transmission to indicate NACK
FIG. 9: Example of preamble transmission with CE level repetition to indicate NACK

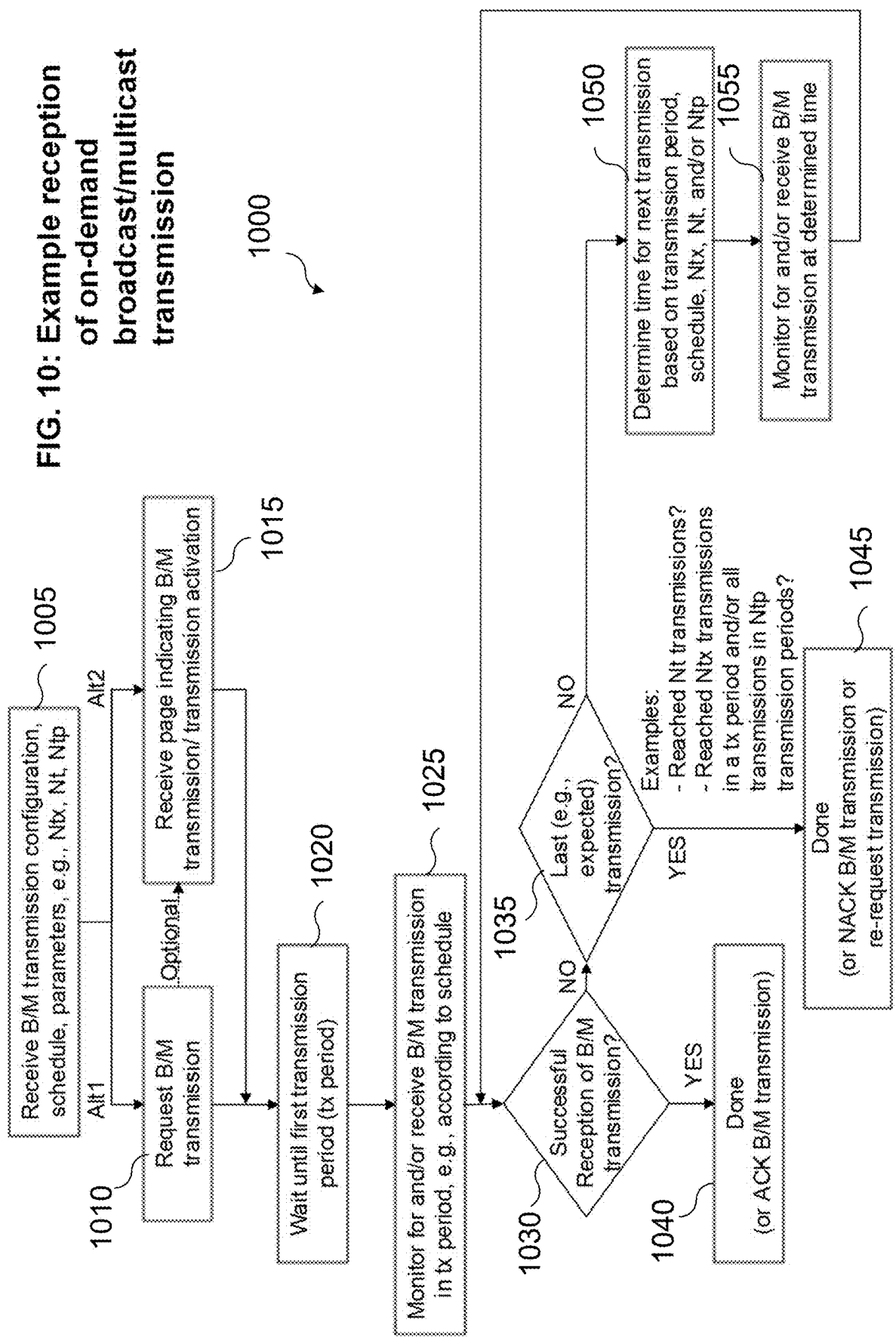
FIG. 10: Example reception of on-demand broadcast/multicast transmission

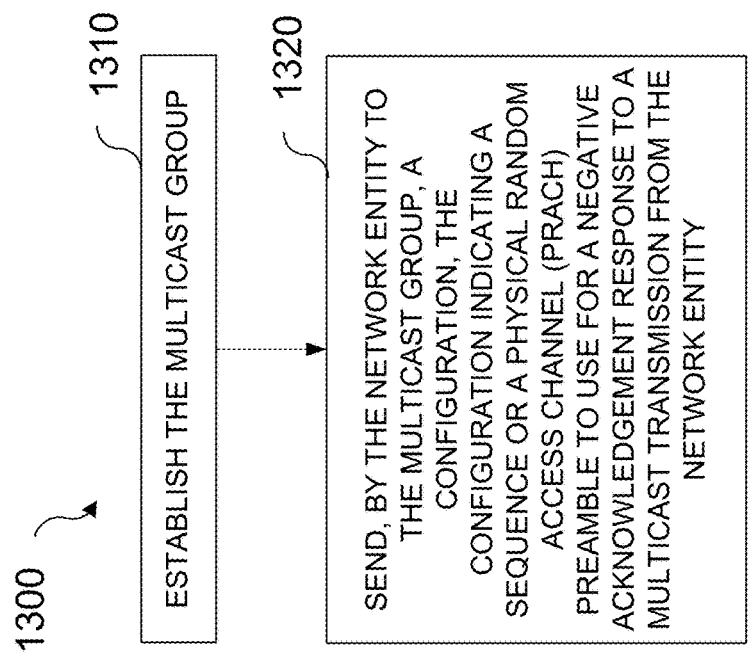

1410 — ESTABLISH THE MULTICAST GROUP

1420 — SEND, BY THE NETWORK ENTITY TO THE WTRUs OF THE MULTICAST GROUP, ONE OR MORE CONFIGURATIONS, EACH CONFIGURATION INDICATES A SET OF ONE OR MORE SEQUENCES OR PRACH PREAMBLES AND A SET OF ONE OR MORE TIME-FREQUENCY RESOURCES TO BE USED FOR RECEIVING THE SEQUENCES OR THE PRACH PREAMBLES FROM A RESPECTIVE WTRU

1430 — SEND, BY THE NETWORK ENTITY TO THE MULTICAST GROUP, THE MULTICAST TRANSMISSION

1440 — MONITOR FOR SEQUENCES OR PREAMBLES BASED ON THE SET OF ONE OR MORE SEQUENCES OR PRACH PREAMBLES AND THE SET OF ONE OR MORE TIME-FREQUENCY RESOURCES INDICATED IN THE ONE OR MORE CONFIGURATIONS

1450 — ON CONDITION THAT ONE OR MORE MONITORED FOR SEQUENCES OR PREAMBLES ARE RECEIVED, RETRANSMIT, BY THE NETWORK ENTITY, A PORTION OR PORTIONS OF THE MULTICAST TRANSMISSION

1510 — SEND, BY THE WTRU TO A NETWORK ACCESS POINT, A SEQUENCE OR PHYSICAL RANDOM ACCESS CHANNEL (PRACH) PREAMBLE INDICATING TO PROVIDE SYSTEM INFORMATION (SI) TO THE WTRU

1520 — MONITOR, BY THE WTRU, FOR THE SI RESPONSIVE TO RECEIPT BY THE NETWORK ACCESS POINT OF THE SEQUENCE OR PRACH PREAMBLE

1530 — CONFIGURE, THE RESPECTIVE WTRU, USING A RECEIVED SI

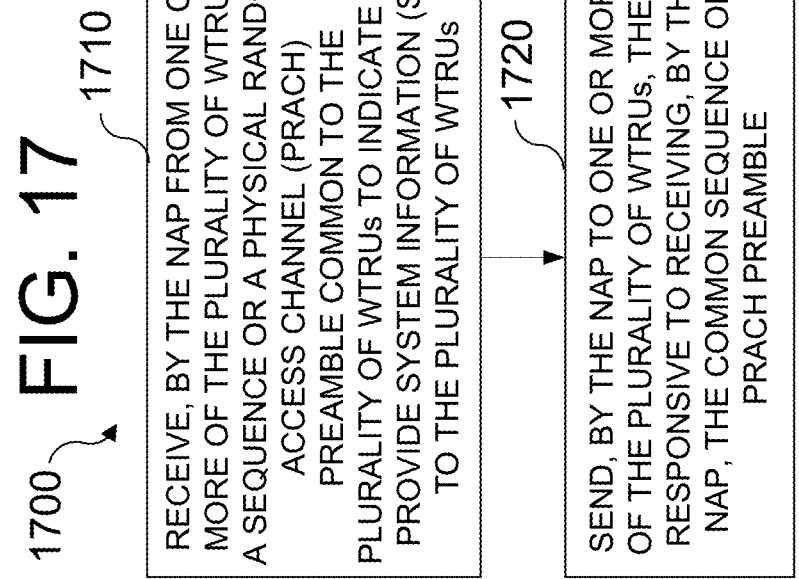
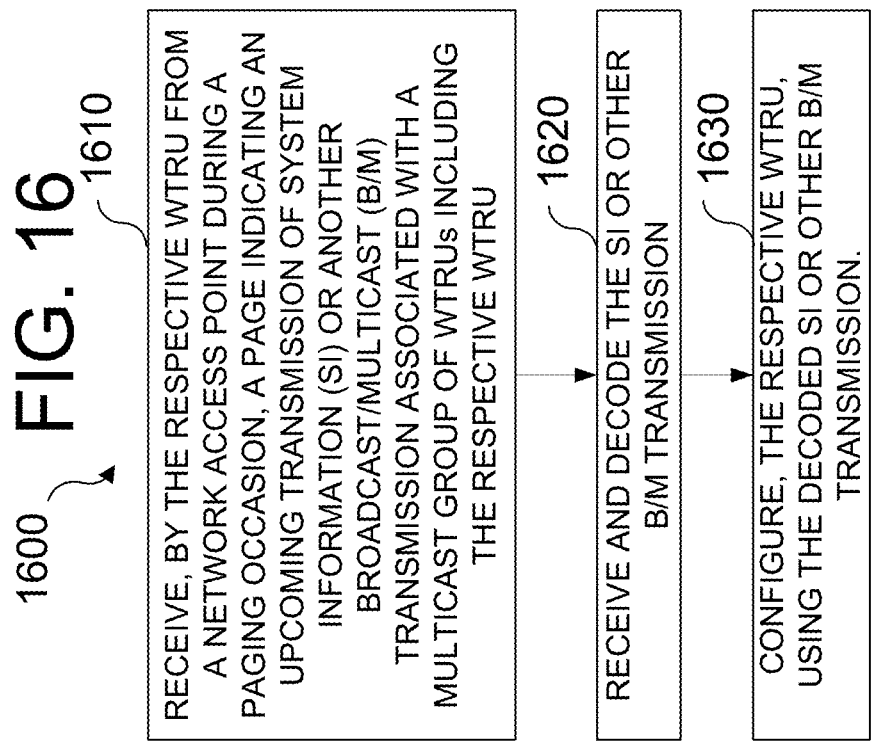

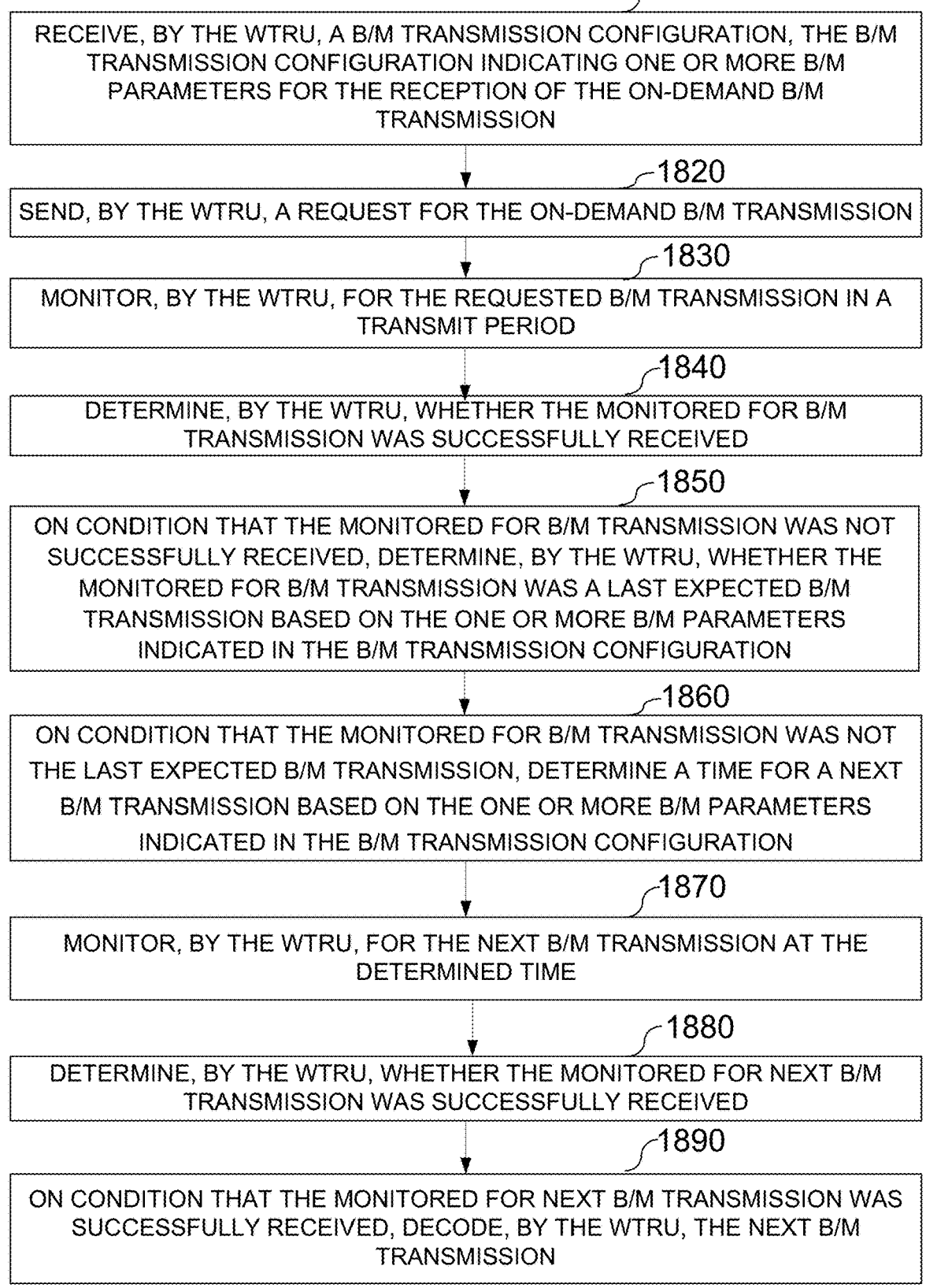

US 11,818,073 B2

METHODS, APPARATUS, SYSTEMS AND PROCEDURES FOR SUPPORTING MULTICAST TRANSMISSION

CROSS REFERENCE TO RELATED APPLICATIONS

This application is a continuation application of U.S. patent application Ser. No. 16/301,647, filed Nov. 14, 2018, which is a National Stage Application filed under 35 U.S.C. 371 of International Application No. PCT/US2017/033459, filed May 19, 2017, and claims priority from U.S. Provisional Application No. 62/454,297, filed Feb. 3, 2017, U.S. Provisional Application No. 62/416,410, filed Nov. 2, 2016, U.S. Provisional Application No. 62/376,981, filed Aug. 19, 2016, and U.S. Provisional Application No. 62/339,565, filed May 20, 2016, the contents of each being incorporated herein by reference.

FIELD

The present invention relates to the field of communications and, more particularly, to methods, apparatus and systems supporting Multicast Transmission (MT).

BRIEF DESCRIPTION OF THE DRAWINGS

A more detailed understanding may be had from the Detailed Description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein:

FIG. 6 is a diagram illustrating an example of preamble transmission to indicate a negative acknowledgement (NACK);

FIG. 7 is a diagram illustrating an example of preamble transmission to indicate a discontinuous transmission (DTX);

FIG. 8 is a diagram illustrating another example of preamble transmission to indicate a NACK;

FIG. 9 is a diagram illustrating an example of preamble transmission to indicate a NACK with Coverage Enhancement (CE) level repetition;

FIG. 10 is a diagram of a representative on-demand broadcast/multicast (B/M) transmission;

FIG. 12 is a diagram illustrating a representative method of managing a multicast communication;

FIG. 13 is a diagram illustrating another representative method of managing a multicast communication;

FIG. 14 is a diagram illustrating a further representative method of managing a multicast communication;

FIG. 15 is a diagram illustrating a representative method of configuring a WTRU;

FIG. 16 is a diagram illustrating a representative method of configuring a WTRU in a paging mode;

FIG. 17 is a diagram illustrating a representative method for serving a plurality of WTRUs; and FIG. 18 is a diagram illustrating a representative method of reception of an on-demand broadcast and/or multicast (B/M) transmission.

DETAILED DESCRIPTION

A detailed description of illustrative embodiments may now be described with reference to the figures. However, while the present invention may be described in connection with representative embodiments, it is not limited thereto and it is to be understood that other embodiments may be used or modifications and additions may be made to the described embodiments for performing the same function of the present invention without deviating therefrom.

Although the representative embodiments are generally shown hereafter using wireless network architectures, any number of different network architectures may be used including networks with wired components and/or wireless components, for example.

Figure 1:
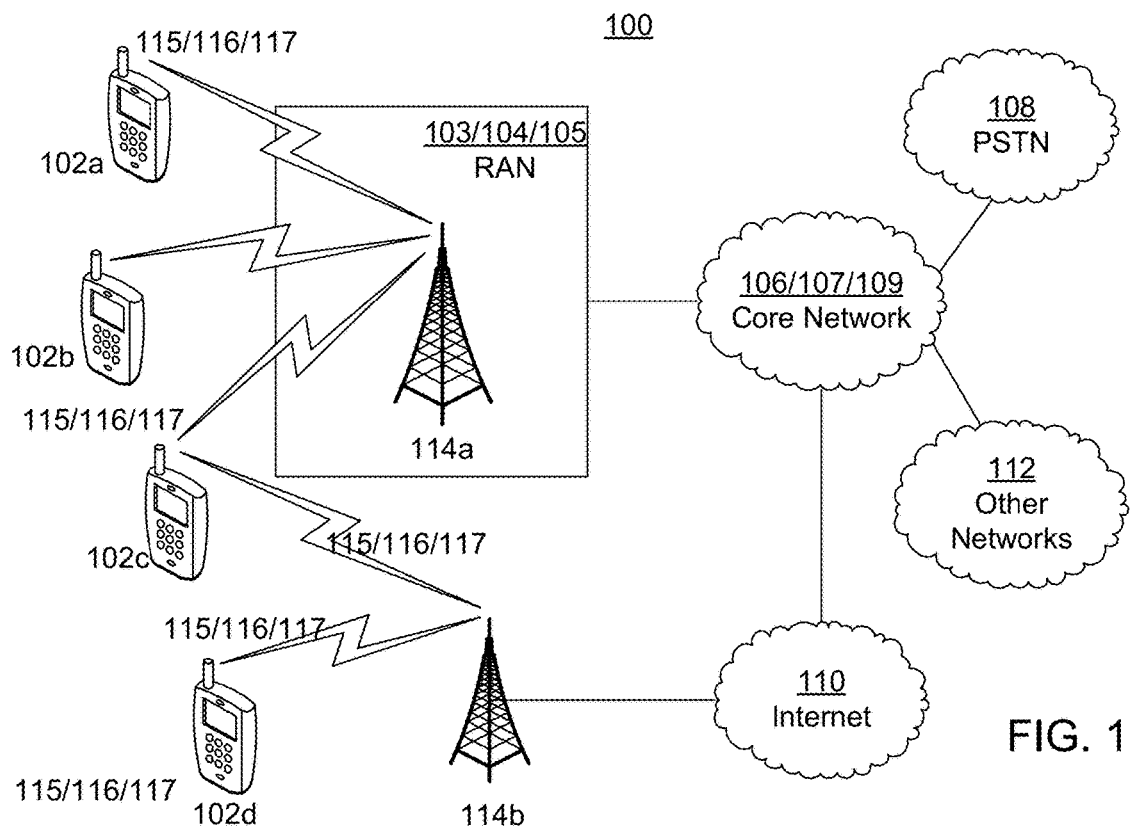
FIG. 1 is a system diagram illustrating an example communications system in which one or more disclosed embodiments may be implemented.

FIG. 1 is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1, the communications system 100 may include wireless transmit/receive units (WTRUs) 102a, 102b, 102c, 102d, a radio access network (RAN) 104, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, which may be referred to as a "station" and/or a "STA", may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, machine type communications (MTC) devices and the like. The WTRU 102a, 102b, 102c and 102d is interchangeably referred to as a WTRU herein.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1 may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM, UMTS, CDMA 2000, WiMAX, or WiFi radio technology.

The core network 106/107/109 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1 may be configured to communicate with the base station 114a, which may employ a cellular-based radio technology, and with the base station 114b, which may employ an IEEE 802 radio technology.

Figure 2:
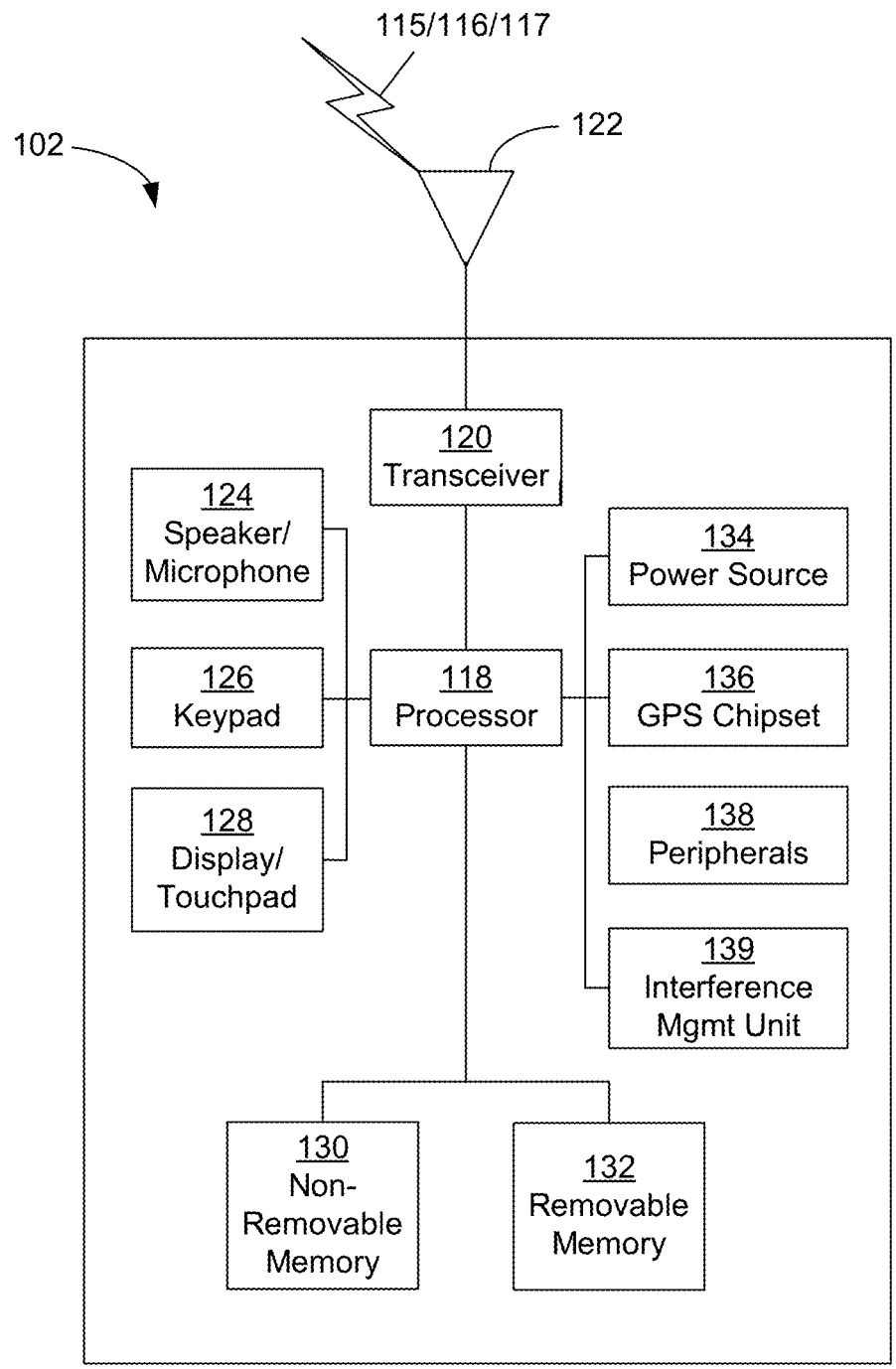
FIG. 2 is a system diagram illustrating an example wireless transmit/receive unit (WTRU) that may be used within the communications system illustrated in FIG. 1.

FIG. 2 is a system diagram illustrating an example WTRU 102. As shown in FIG. 2, the WTRU 102 may include a processor 118, a transceiver 120, a transmit/receive element 122, a speaker/microphone 124, a keypad 126, a display/ touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 2 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 2 as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

The WTRU 102 may include a full duplex radio for which transmission and reception of some or all of the signals (e.g., associated with particular subframes for both the UL (e.g., for transmission) and downlink (e.g., for reception)) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118).

Figure 3:
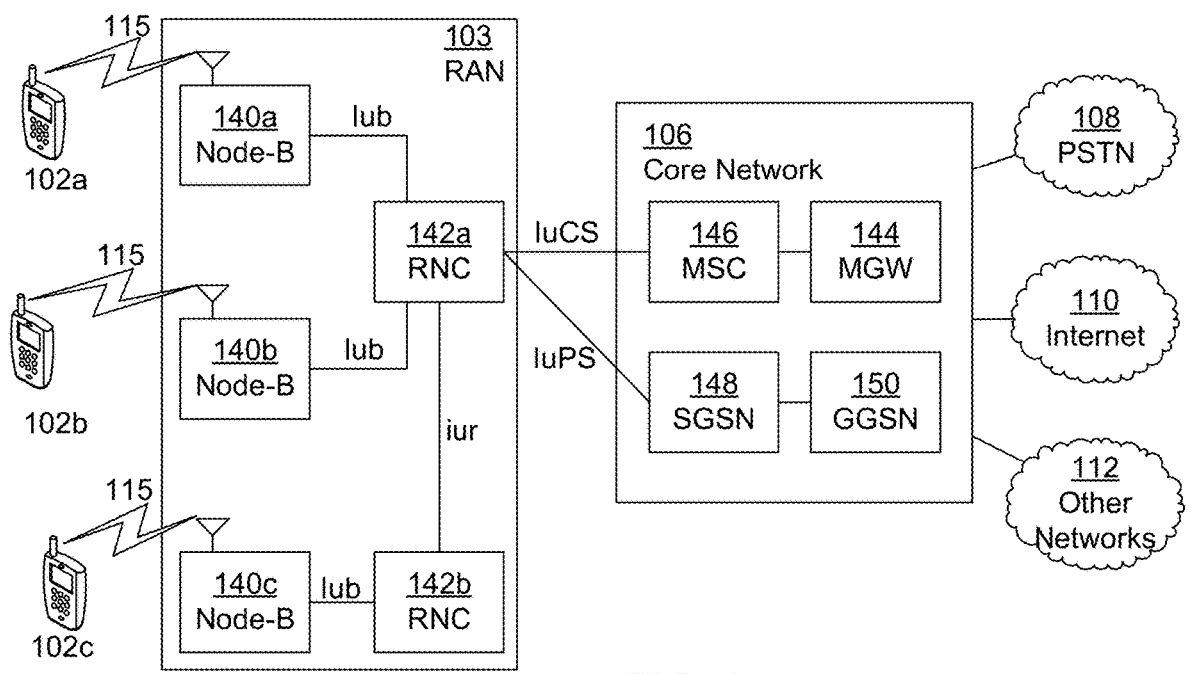
FIG. 3 is a system diagram illustrating an example radio access network and another example core network that may be used within the communications system illustrated in FIG. 1.

FIG. 3 is a system diagram illustrating the RAN 103 and the core network 106 according to another embodiment. As noted above, the RAN 103 may employ a UTRA radio technology to communicate with the WTRUs 102a, 102b, 102c over the air interface 115. The RAN 103 may also be in communication with the core network 106. As shown in FIG. 3, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 3, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142*a*, 142*b* may be in communication with one another via an Iur interface. Each of the RNCs 142*a*, 142*b* may be configured to control the respective Node-Bs 140*a*, 140*b*, 140*c* to which it is connected. In addition, each of the RNCs 142*a*, 142*b* may be configured to carry out or support other functionality, such as outer loop power control, load control, admission control, packet scheduling, handover control, macrodiversity, security functions, data encryption, and the like.

The core network 106 shown in FIG. 3 may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142*a* in the RAN 103 may be connected to the MSC 146 in the core network 106 via an IuCS interface. The MSC 146 may be connected to the MGW 144. The MSC 146 and the MGW 144 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices.

The RNC 142*a* in the RAN 103 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, 102*c* with access to packet-switched networks, such as the Internet 110, to facilitate communications between and the WTRUs 102*a*, 102*b*, 102*c* and IP-enabled devices.

As noted above, the core network 106 may also be connected to the other networks 112, which may include other wired and/or wireless networks that are owned and/or operated by other service providers.

Figure 4:
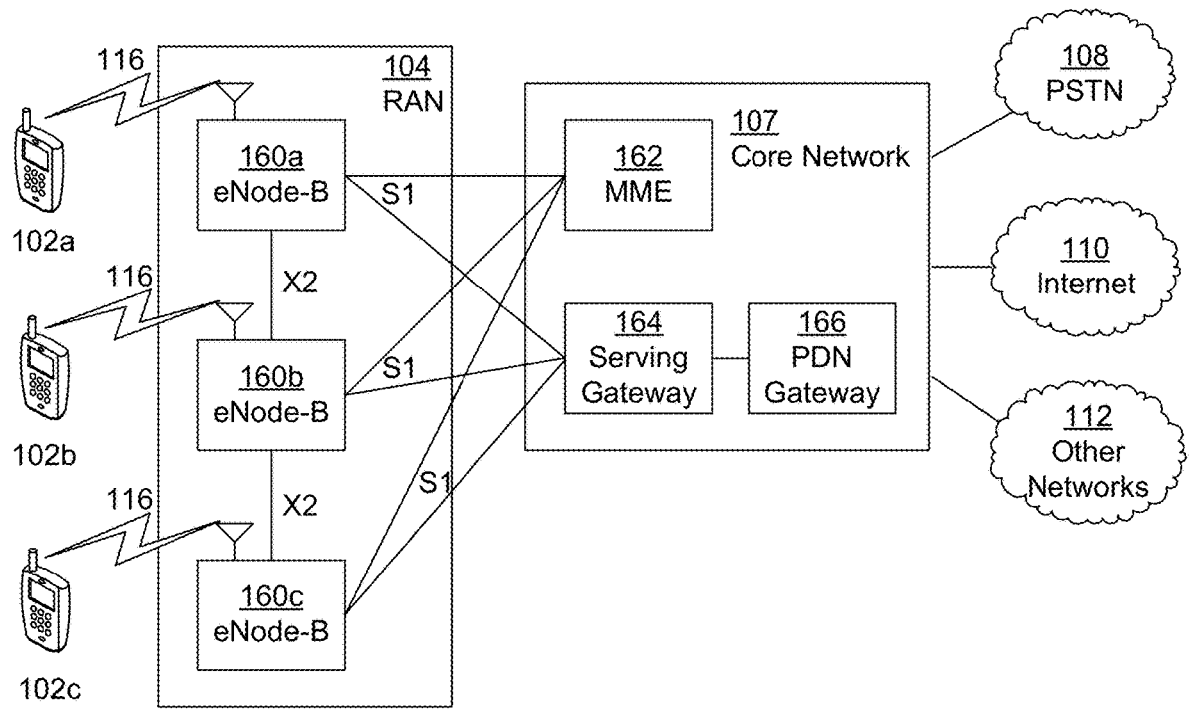
FIG. 4 is a system diagram illustrating another example radio access network and another example core network that may be used within the communications system illustrated in FIG. 1.

FIG. 4 is a system diagram illustrating the RAN 104 and the core network 107 according to an embodiment. As noted above, the RAN 104 may employ an E-UTRA radio technology to communicate with the WTRUs 102*a*, 102*b*, 102*c* over the air interface 116. The RAN 104 may also be in communication with the core network 107.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink (UL) and/or downlink (DL), and the like. As shown in FIG. 4, the eNode-Bs 160*a*, 160*b*, 160*c* may communicate with one another over an X2 interface.

The core network 107 shown in FIG. 4 may include a mobility management entity (MME) 162, a serving gateway (SGW) 164, and a packet data network (PDN) gateway (or PGW) 166. While each of the foregoing elements are depicted as part of the core network 107, it will be appreciated that any of these elements may be owned and/or operated by an entity other than the core network operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The serving gateway 164 may be connected to each of the eNode Bs 160*a*, 160*b*, 160*c* in the RAN 104 via the S1 interface. The serving gateway 164 may generally route and forward user data packets to/from the WTRUs 102*a*, 102*b*, 102*c*. The serving gateway 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The serving gateway 164 may be connected to the PDN gateway 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 107 may facilitate communications with other networks. For example, the core network 107 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102*a*, 102*b*, 102*c* with access to the other networks 112, which may include other wired and/or wireless networks that are owned and/or operated by other service providers.

Figure 5:
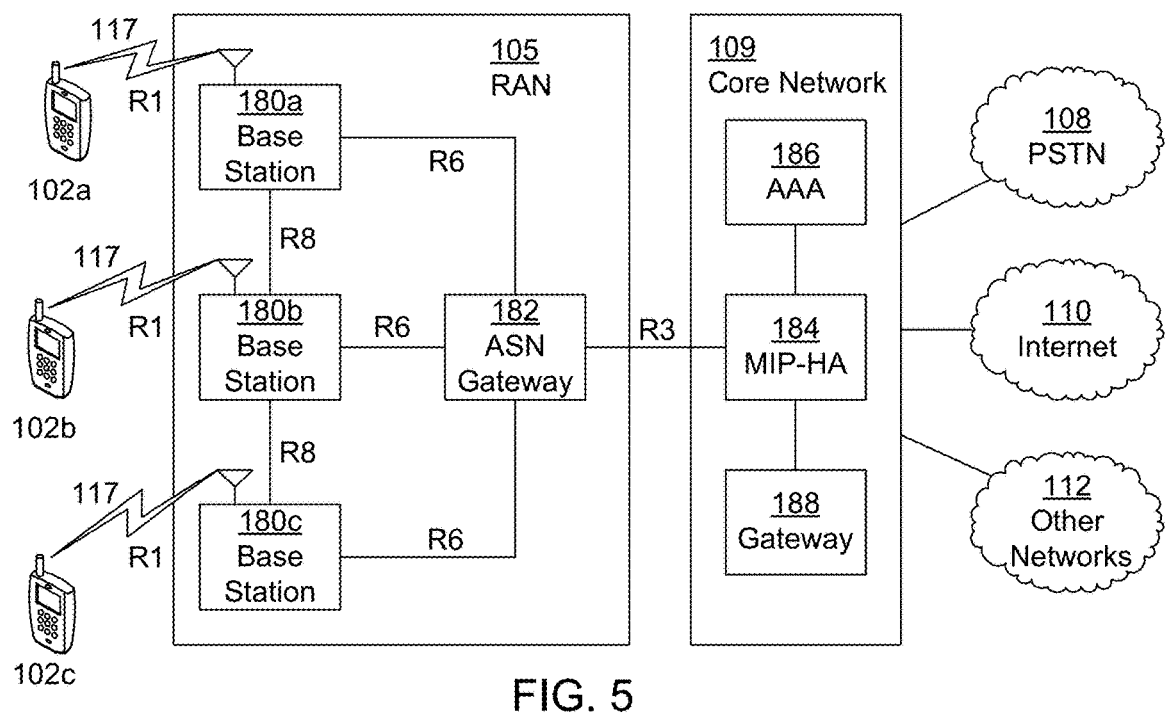
FIG. 5 is a system diagram illustrating a further example radio access network and a further example core network that may be used within the communications system illustrated in FIG. 1.

FIG. 5 is a system diagram illustrating the RAN 105 and the core network 109 according to an embodiment. The RAN 105 may be an access service network (ASN) that employs IEEE 802.16 radio technology to communicate with the WTRUs 102*a*, 102*b*, and 102*c* over the air interface 117. As will be further discussed below, the communication links between the different functional entities of the WTRUs 102*a*, 102*b*, 102*c*, the RAN 105, and the core network 109 may be defined as reference points.

As shown in FIG. 5, the RAN 105 may include base stations 180*a*, 180*b*, 180*c*, and an ASN gateway 182, though it will be appreciated that the RAN 105 may include any number of base stations and ASN gateways while remaining consistent with an embodiment. The base stations 180*a*, 180*b*, 180*c* may each be associated with a particular cell (not shown) in the RAN 105 and may each include one or more transceivers for communicating with the WTRUs 102*a*, 102*b*, 102*c* over the air interface 117. In one embodiment, the base stations 180*a*, 180*b*, 180*c* may implement MIMO technology. The base station 180*a*, for example, may use multiple antennas to transmit wireless signals to, and/or receive wireless signals from, the WTRU 102*a*. The base stations 180*a*, 180*b*, 180*c* may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 5, the RAN 105 may be connected to the core network 109. The communication link between the RAN 105 and the core network 109 may be defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any of these elements may be owned and/or operated by an entity other than the core network operator.

The MIP-HA 184 may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. The gateway 188 may provide the WTRUs 102a, 102b, 102c with access to the other networks 112, which may include other wired and/or wireless networks that are owned and/or operated by other service providers.

Although not shown in FIG. 5, it will be appreciated that the RAN 105 may be connected to other ASNs, other RANS (e.g., RANs 103 and/or 104) and/or the core network 109 may be connected to other core networks (e.g., core network 106 and/or 107). The communication link between the RAN 105 and the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Although the WTRU is described in FIGS. 1-5 as a wireless terminal, it is contemplated that in certain representative embodiments that such a terminal may use (e.g., temporarily or permanently) wired communication interfaces with the communication network.

Although various representative networks are described herein, representative embodiments are equally applicable to other networks including 5G and 5G interworking networks. It is contemplated that in certain representative network architectures, eNode-Bs, network access points, radio heads and/or other network entities, among others may be power conserving devices and/or thin client (e.g., thin resource) type devices.

Although different network devices are shown including an eNode-B, it is contemplated that other devices may be equally applicable such as a gNB, for example in a 5G network architecture.

With new applications emerging for cellular technology, such as smart watches, alarm reporting, automotive safety, and/or factory process control, the use and/or importance of machine type communications (MTC) has rapidly increased. The growing popularity of the Internet of Things (IoT) is expected to increase (e.g., greatly increase) the density of MTC devices per geographic area. In an environment populated (e.g., densely populated) with cellular devices, use of MTs may be implemented, appropriate and/or desirable for increasing spectrum efficiency for services, applications, and/or maintenance that may be applicable to multiple devices. For example, software (SW) and/or firmware (FW) upgrades over the air may allow deployed devices to receive patches and/or SW upgrades (e.g., without in-field device replacement). Use of MTs may improve the spectrum efficiency for SW/FW upgrades, for example, by enabling a multitude of devices to receive the upgrade at the same time using the same transmission resources.

In certain representative embodiments, methods, apparatus and procedures may be implemented to provide for SW downloads over, for example, the Physical Downlink Shared Channel (PDSCH) that may be for Internet devices, for example Narrow Band (NB) Internet devices (e.g., IoT devices and/or MTC devices, among others).

In certain representative embodiments, methods, apparatus and procedures may be implemented to provide NACK/DTX feedback, for example, for MT.

In certain representative embodiments, a preamble (e.g., a sequence) and/or a Physical Random Access Channel (PRACH) transmission may be used to indicate a NACK (e.g., using timing from the transmission to know and/or determine when to send the NACK).

In certain representative embodiments, a preamble (e.g., a sequence) and/or a PRACH transmission may be used to indicate a NACK for a specific data block or to indicate, for example, a missed transmission (DTX) (e.g., a specific preamble or resources may be used to indicate a specific data block or specific data blocks). A data block may be a transport block (TB).

In certain representative embodiments, a sequence number may be provided, included, indicated and/or added in a Downlink Control Information (DCI) such that a WTRU 102 may know and/or may determine what packets, data blocks, TBs, and/or information is or was missed based on sequence numbers (e.g., sequence numbers of data blocks, TBs, packets and/or information that is received). A packet may be or may include one or more data blocks or TBs.

In certain representative embodiments, blocks or sets of transmissions may be scheduled such that a WTRU 102 may know and/or may determine what packets, data blocks, TBs, and/or information is or was missed based on the schedule.

In certain representative embodiments, the preamble and/or time-frequency (TF) resources for use with NACK/DTX feedback may be determined.

In certain representative embodiments, paging for MT, for example for SW updating, may be implemented.

In certain representative embodiments, a control channel or a data channel may include a flag (e.g., a MT flag), for example, to indicate an upcoming MT and the WTRU 102 may receive the MT in response to receipt of the flag. The control channel or the data channel may be associated with a page and the WTRU 102 may receive the MT in response to receipt of the page.

In certain representative embodiments, the SW version may be indicated or included in the MT (e.g., and/or may be indicated or included in the associated DCI) and the WTRU 102 may receive one or more MTs based on whether the SW version is newer than a current version (e.g., stored, loaded and/or executing on the WTRU 102).

In certain representative embodiments, a CE level may be implemented, for example, for use with NACK/DTX procedures. Separate resources may be used for different CE levels and/or different CE levels may be indicated by different/separate resources.

In certain representative embodiments, the WTRU 102 may transmit at a particular power for the NACK/DTX (e.g., at a maximum power and/or a predefined power, among others).

In certain representative embodiments, the CE level and a configuration for MT may be implemented (e.g., and/or provided to the WTRU 102). For example, the WTRU in connected mode may be configured with a CE level to use and the WTRU in idle mode may determine the CE level from a measurement or control channel decoding. As another example, in idle mode, the WTRU 102 may do and/or execute a Random Access (RA) procedure to indicate a current CE level (e.g., to the network) and a new SW download cause for (e.g., and/or in) a RRC connection request.

In certain representative embodiments, the CE Level for MT may be based on a WTRU identifier (e.g., WTRU ID). For example, for WTRUs 102 to receive a SW update, a network (e.g., serving the WTRUs 102) may indicate identifiers (e.g., the WTRU IDs). An eNode-B 160 may use the WTRU IDs to get and/or obtain CE levels to determine a CE level to use for the MT to one or more of the WTRUs 102.

In certain representative embodiments, a request (e.g., by the network to the WTRUs 102) for interest in the SW download may be implemented. Some WTRUs such as connected WTRUs 102 may use RRC signaling for the request/reply. Some other WTRUs such as idle WTRUs 102 may use paging (e.g., paging procedures) for the request, may use RA to connect and/or to send the reply. In certain representative embodiments, the reply may be and/or may use one or more configured preambles and/or TF resources that the WTRU may use to indicate interest. For example, the request for the SW download may provide the available version, e.g., in a DCI, to enable the WTRU to determine interest in the SW download.

In certain representative embodiments, broadcast or MT request procedures may be implemented. For example, at least some System Information (SI) (e.g., SI Blocks (SIBs)) may not be transmitted (e.g., unless requested and/or needed). In certain examples, a preamble (e.g., a PRACH preamble) may be used to make the request (e.g., for transmission of SI, one or more SIBs or another MT such as a SW download). Separate preambles or resources may be implemented for different transmissions and/or different transmission types (TTypes) (e.g., for different types such as SI and SW download and/or for different SI and/or different SIBs) and/or according to CE mode or level.

In certain representative embodiments, paging procedures may be implemented to indicate broadcast or MT. For example, a page may indicate a SI transmission (e.g., with or without SI modification) may occur. In certain representative embodiments, a separate indicator and/or value tag may indicate transmission vs. modification (for example the transmission with SI modification or the transmission without SI modification.) A configured transmission period (e.g., that may be the same or different from a system information modification period) is a period during which system information may be transmitted (e.g., potentially may be transmitted). For example, WTRUs 102 may be paged to indicate that system information may be or is to be transmitted in an upcoming (e.g., next) transmission period.

In certain representative embodiments, a random access connection request may indicate a request for broadcast/multicast information. For example, a preamble or a PRACH may be used to indicate a random access request that may be intended for connection request. An RA Response (RAR) (e.g., a RA msg2) may include SI. The RAR may include or be divided into common and WTRU-specific contents and the SI may be in the common contents. In certain examples, the connection setup message may include system information.

A MT may be used and/or considered for services or applications (e.g., in the downlink) that may not need or use feedback from the receiving devices confirming successful reception, for example in TV broadcast, in eMBMS, and/or in advertising, among others. For MT where it may be appropriate that the WTRU or device successfully receives the transmission, for example for a SW/FW upgrade, feedback from the receiving devices may be used and/or appropriate. For example, the feedback may use a mechanism whereby a transmission (e.g., each transmission and/or group of transmissions) may be acknowledged by each device. Having a multitude of devices individually send an ACK or a NACK for a transmission (e.g., each transmission and/or group of transmissions) may result in inefficiencies and wasted air interface resources.

In certain representative embodiments, alternative procedures and/or apparatus may be used to enable feedback (e.g., limited feedback).

In an environment where some devices may be coverage limited and/or use CE techniques, such as repetition, a MT may accommodate or may need to accommodate multiple levels of coverage, for example to ensure the device with the worst coverage receives the transmission. Procedures and/or apparatus may be used to determine the coverage (e.g., CE) level or levels at which to make the MT, for example to support the devices receiving the transmission without wasting resources for coverage that may not be appropriate and/or needed.

A WTRU 102 may receive a MT, configuration of a MT, and/or an indication of a MT, for example from an eNode-B 160. The MT may be a transmission intended for a set or group of one or more WTRUs 102. The MT may be or may include a data channel such as a downlink (DL) data channel. Examples of a DL data channel may include, but are not limited to, PDSCH, MTC PDSCH (mPDSCH), short PDSCH or short-TTI PDSCH (sPDSCH), and/or Narrow Band PDSCH (NB-PDSCH), among others. Data and/or control information may be carried by a data channel.

The MT may be or may include a control channel that may be carried by a data channel. The MT may be or may include a control channel, e.g., a DL control channel, such as a PDCCH, an enhanced PDCCH (ePDCCH), a MTC PDCCH (mPDCCH), a Narrow Band PDCCH (NB-PDCCH), and/or a short or short-TTI PDCCH (sPDCCH), among others. A multicast control channel may be monitored with a Radio Network Temporary Identifier (RNTI), e.g., a MT RNTI (MT-RNTI). The MT-RNTI may be fixed or configured (e.g., a fixed value or a configured value). The MT-RNTI may be configured via WTRU-specific or cell-specific signaling (e.g., broadcast signaling). The MT-RNTI may be configured for a group of one or more WTRUs 102. At least one of transmission, configuration and/or indication may be by an eNode-B 160.

Although certain representative embodiments/examples set forth herein may include the use of MT, application of these representative embodiments/examples may use other transmission mechanisms, such as broadcast and/or unicast transmissions, among other (e.g., MT is only a non-limiting example). In certain representative embodiments another type of transmission may be applied and are still be consistent with the disclosure herein. For example, a broadcast may be substituted for a multicast (e.g., and vice versa) and are still be consistent with this disclosure. It is also contemplated that other types of transmissions may be used in lieu of or in addition to MTs and are still consistent with the disclosure herein.

Although NACK feedback and DTX feedback are described with respect to MTs, it is contemplated that other forms of feedback are possible in accordance with the disclosure herein. For example, such feedback may include other forms of group feedback.

Example NACK/DTX Feedback for MT

A WTRU 102 may receive one or more data transmissions, for example from an eNode-B 160. A data transmission may be comprised of or may include a set of one or more data blocks that may be transmitted over time. A data block, for example, may be a transport block (TB) and/or a MAC PDU. One or more data blocks may be transmitted per time period or transmission time interval (TTI). For example, a time period may be a symbol, a slot, a subframe, a set of symbols, a set of slots or a set of subframes. A data block may be repeated in multiple time periods or TTIs, for example when CE may be used. The repetitions may be combined by a receiver, e.g., by a WTRU 102, for example to receive or successfully receive the data block. Successful reception may correspond to receiving a correct cyclic redundancy check (CRC).

The term data block may refer to one data block. The term data block may be used to represent or refer to one or more (e.g., the combination of one or more) repetitions of or associated with a data block that may be used to receive, decode, and/or determine the data block, e.g., successfully. For example, repetitions of or associated with a data block may be combined, e.g., soft-combined, to receive, decode, and/or determine the data block, e.g., successfully.

A MT, such as for a SW/FW download and/or a SW/FW upgrade, may be comprised of or include a set of data blocks that may be intended for a group of one or more WTRUs 102.

A WTRU 102 may provide feedback, for example, to indicate a success or lack of success of reception of a data block from a MT. A WTRU 102 may provide feedback for multicast data and/or control channels. In certain representative embodiments, a WTRU 102 may provide feedback (e.g., only provide feedback) for multicast data channels. In certain representative embodiments, a WTRU 102 may not provide feedback for multicast control channels.

In the examples and representative embodiments described herein, a TB or a PDSCH, among others may be examples of a data block. One of skill in the art understands that other data blocks are possible while still being consistent with the disclosure herein.

Representative Procedure for a WTRU to Indicate NACK Using a Preamble

A preamble may be provided and/or used for indicating a NACK. For example, a WTRU 102 may transmit a preamble, such as a PRACH preamble, to indicate a NACK for a data block (or a set of data blocks) that may be a multicast data block (or a set of such data blocks). A preamble that may be used to indicate a NACK may be referred to herein as a NACK preamble. A WTRU 102 may transmit a preamble (e.g., a NACK preamble) to indicate that the WTRU 102 did not successfully receive a data block and/or to indicate that the WTRU 102 did not successfully receive at least one data block of a set of data blocks. A WTRU 102 may not transmit an acknowledgment (ACK), for example for one or more (e.g., any) data blocks that it may have received successfully.

A preamble (e.g., a NACK preamble) may be a signal (e.g., representing a sequence) or a sequence such as a Zadoff-Chu sequence, a gold sequence, and/or an m-sequence, among others. A preamble may be an OFDM signal or a sequence (e.g., OFDM sequence) with a cyclic prefix (CP). The CP length may be configured, for example by broadcast or dedicated signaling. The CP length may be configured such that WTRUs 102 near to and far from a cell center may transmit preambles (e.g., the same or orthogonal preambles) in the same TF resources such that, for example, the network (e.g., a network entity and/or an eNode-B 160) may detect the transmitted preamble or preambles. A PRACH may be used as a non-limiting example of a signal, a channel or a set of time-resources (e.g., TF resources) that may be transmitted and/or used, for example by a WTRU 102 without a grant (e.g., a scheduling grant). A PRACH may be transmitted on one or more resources that may be configured, signaled and/or known. A PRACH may be transmitted asynchronously, for example with respect to a timing reference.

The term time-frequency (TF) may be used to represent time and/or frequency. For example, a TF resource may be a resource in time and/or frequency. Time-frequency and time/frequency may be used interchangeably herein.

In certain examples, a first preamble may be used for a NACK from a first set or group of WTRUs 102. A second preamble may be used for a NACK from a second set or group of WTRUs 102. The first and second preambles may be the same (e.g., have a common preamble) or may be different.

A first TF resource (or set of TF resources) may be used for a NACK from a first set or group of WTRUs 102. A second TF resource (or set of TF resources) may be used for a NACK from a second set or group of WTRUs 102. The first and second TF resources (or one or more sets of TF resources) may be the same or different.

An eNode-B 160 may provide (e.g., via a configuration that the eNode-B 160 may signal) one or more preambles (e.g., one or more NACK preambles) and/or one or more TF resources on which to transmit the one or more preambles, for example to indicate a NACK.

In certain examples, an eNode-B 160 may transmit a set of one or more data blocks. A WTRU 102 may attempt to receive (e.g., monitor for) the one or more data blocks. The WTRU 102 may not successfully receive (e.g., may determine that the WTRU 102 did not successfully receive) at least one of the data blocks. A WTRU 102 may transmit a preamble (e.g., a NACK preamble), for example from the configured set of preambles, to indicate that the WTRU 102 did not successfully receive at least one data block. The WTRU 102 may transmit, for example, the preamble (e.g., the NACK preamble) on one or more of the configured TF resources.

A WTRU 102 may determine reception of a data block as unsuccessful, for example when the WTRU 102 receives and/or attempts to receive the data block and determines the CRC of the data block to be incorrect and/or another error condition related to the data block.

A WTRU 102 may determine reception of a data block as unsuccessful when the WTRU 102 expects a data block or control signaling for a data block, for example at a certain time and/or frequency and does not successfully receive the control signaling or determines the CRC of the data block to be incorrect.

An eNode-B 160 and/or another network entity may receive at least one preamble that may indicate a set of one or more data blocks that may not have been successfully received by at least one WTRU 102 (e.g., of a multicast group). The eNode-B 160 may retransmit at least one of the data blocks that may not have been successfully received.

FIG. 6 is a diagram illustrating an example preamble transmission procedure to indicate a NACK.

Referring to FIG. 6, the example preamble transmission procedure 600 may include, at block 610, a WTRU 102 receiving a configuration including or indicating NACK preambles and/or TF resources. At block 620, the WTRU 102 may attempt to receive a data channel or data block of a MT. At block 630, the WTRU 102 may determine whether the reception of the data channel or data block of the MT was successful. For example, the WTRU 102 may determine whether a CRC check of the data associated with the data channel or data block was successful. On condition that the WTRU 102 determines that the reception of the data channel or data block of the MT was successful, at block 640, the processing may stop and/or the WRTU may not send an ACK or NACK indication to the eNode-B 160 or other network entity. On condition that the WTRU 102 determines that the reception of the data channel or data block of the MT was not successful, at block 650, the WTRU 102 may determine a preamble and at least one TF resource to indicate a NACK. At block 660, the WTRU 102 may send the determined preamble on the determined TF resource or TF resources.

For example, a WTRU 102 may use the example preamble transmission to indicate a NACK (e.g., to an eNode-B 160 and/or another network entity) for a data block of a MT. A preamble may be transmitted to indicate a NACK for a data block or for at least one data block of a set of data blocks.

Representative Procedure for the WTRU to Indicate DTX Using a Preamble A preamble may be provided and/or used for indicating DTX. The indication of a NACK may or may not be sufficient for an eNode-B 160 to know and/or determine whether a WTRU 102 received a data block successfully. For example, when a WTRU 102 does not receive a data block and does not know the WTRU 102 should have received the data block, or when the WTRU 102 cannot determine that the data block has not been received, the WTRU 102 may not indicate that WTRU 102 missed the data block. A missed transmission or a set of missed transmissions may be referred to herein as DTX or a DTX.

In certain examples, a WTRU 102 may transmit a preamble, such as a PRACH preamble, to indicate a DTX for a data block (or a set of data blocks) that may be a multicast data block (or a set of multicast data blocks). A preamble that may be used to indicate a DTX may be referred to herein as a DTX preamble.

A WTRU 102 may transmit a preamble (e.g., a DTX preamble) to indicate that the WTRU 102 missed reception of a data block and/or at least one data block of a set of data blocks. An eNode-B 160 may provide (e.g., via a configuration that the eNode-B 160 may signal) one or more preambles (e.g., one or more DTX preambles) and/or one or more TF resources on which to transmit the one or more preambles, for example to indicate a DTX. At least one of the preambles and/or TF resources (e.g., resources in time and/or frequency) for indicating a NACK and a DTX may be different. For example, different frequencies (e.g., subcarriers) may be used. In certain representative embodiments, different preambles may be used and/or different resources in time may be used.

In certain examples, an eNode-B 160 may transmit a set of one or more data blocks. A WTRU 102 may determine that the WTRU 102 missed reception of a data block (for example a data block with an identification X). The WTRU 102 may transmit a DTX preamble, for example from the configured set of preambles, to indicate that the WTRU 102 missed reception of the data block. The WTRU 102 may transmit the preamble on one or more of the configured TF resources, for example that may be used for indicating a DTX. The WTRU 102 may transmit a preamble that may be associated with and/or configured for identifying the DTX of at least a data block with an identification X. The WTRU 102 may transmit on at least one TF resource that may be associated with and/or configured for identifying the DTX of at least a data block with the identification X.

A WTRU 102 may determine the identification of a missed and/or missing data block based on an identifier (e.g., a missed sequence (e.g., block) identifier (ID) and/or sequence number (SN)). ID and SN may be used interchangeably herein. For example, the WTRU 102 may determine the WTRU missed ID x if it receives ID x+1 or ID x+n, and does not receive ID x, where ID x, ID x+1 and ID x+n may be the identifiers in a set or sequence (e.g., of data blocks). The WTRU 102 may determine that a data block has been missed and/or may be missing based on a schedule for transmission (e.g., of a set of data blocks). For example, if (e.g., on condition that) the WTRU 102 expects to and/or determines that the WTRU 102 should receive a control channel indicating the PDSCH according to a schedule and the WTRU 102 does not receive and/or does not successfully receive the control channel, the WTRU 102 may determine that a data block (e.g., a particular data block) has been missed and/or is missing. The control channel may be a DL control channel that may be received in a control region.

FIG. 7 is a diagram illustrating an example preamble transmission procedure to indicate a DTX. [JASB] Note—I moved the text here, but accepted the changes after the move so you can see what I changed.

Referring to FIG. 7, the example preamble transmission procedure 700 may include, at block 710, a WTRU 102 receiving a configuration including and/or indicating any of: one or more NACK preambles, one or more DTX preambles and/or one or more TF resources. In a first alternative, at block 720, the WTRU 102 may receive a schedule for a MT. In a second alternative, the WTRU may skip block 720 or may not receive a schedule for a MT. At block 730, the WTRU 102 may monitor for a MT. The WTRU 102 may monitor for the scheduled MT, for example for the first alternative. The WTRU may, for example, monitor for a MT via a channel (e.g., a control channel or data channel or other time-frequency aggregation, for example for a MT or multicast services). The channel may be associated with the MT. The WTRU 102 may monitor for the channel according to the received schedule, for example for the first alternative. At block 740, the WTRU 102 may determine whether the WTRU 102 has missed one or more blocks (e.g., any missed blocks) of the MT. The determination may be for a period of time or for a number or set of blocks. For example, the WTRU 102 may determine whether there are one or more skipped sequence numbers (SNs) (e.g., any skipped SNs). On condition that the WTRU 102 determines that the WTRU 102 has not missed a block in the MT or that there are no missed blocks in the MT, at block 750, the WTRU 102 may not send a DTX indication to the eNode-B 160 or other network entity. On condition that the WTRU 102 determines that there is at least one missed block in the MT, at block 760, the WTRU 102 may determine a DTX preamble and TF resources to indicate a DTX of the missed block or blocks. At block 770, the WTRU 102 may send the determined DTX preamble on the determined TF resource or resources. At or subsequent to operating in accordance with block 750 or 770, the processing may stop or the WTRU may continue monitoring for the MT (e.g., a continuation of the MT) or another MT at block 730.

For example, a WTRU 102 may use the example preamble transmission to indicate a DTX (e.g., a missed or missing transmission), e.g., to an eNode-B 160 or other network entity, for example for a data block (e.g., a data block of a MT).

Representative Procedure for WTRU to Indicate NACK/DTX for a Specific Data Block A data block may be associated with an identifier such as a sequence number (e.g., SN) that may be within a set of data blocks. A preamble may be provided and/or used to indicate a NACK (and/or a DTX) for a specific data block or for a sequence number (e.g., sequence identifier (ID)). A sequence number may be indicated (e.g., explicitly indicated) by or in a DL control channel or DL control information (DCI) that may be associated with the transmission of the data block or the set of data blocks. A sequence number may be indicated (e.g., explicitly indicated) by an RNTI that may be associated with the transmission of the data block or the set of data blocks. The RNTI may be used to scramble a DCI (e.g., the CRC of a DCI) that may be associated with the transmission of the data block or the set of data blocks.

A sequence number may be indicated (e.g., implicitly indicated) in a DL control channel based on a DL control channel candidate. For example, one or more DL control channel candidates may be monitored by a WTRU 102 to receive a DL control information and a sequence number may be determined (e.g., as a function of a DL control channel candidate index). A scrambling code may be used for the DL control information and the sequence number may be determined based on the scrambling code used.

A WTRU 102 may transmit and/or indicate a NACK (e.g., an unsuccessful reception) or a DTX (e.g., a missed reception) for a sequence number.

A sequence ID may be or may include a HARQ process ID. A sequence ID may be or may include a HARQ process ID and one or more additional bits. A HARQ process ID may be included in the DCI for a DL transmission and/or a DL retransmission. A sequence number and/or sequence ID may be a block number and/or ID. The terms number, identifier, index, and ID, may be used interchangeably herein.

A HARQ process may be associated with a HARQ process identifier (e.g., HARQ process ID). A HARQ process may be associated with a HARQ buffer. A buffer (e.g., a HARQ buffer) may be, may include or may comprise a soft buffer. A soft buffer may be used for soft combining coded bits from one or more repetitions or retransmissions of a data block (e.g., a TB of data). A retransmission of a data block (e.g., a TB) may include the same or different coded bits as the original (e.g., new) transmission or another retransmission of the data block. A buffer may be or may represent memory, e.g., an amount of memory that may be in a denomination such as bits or bytes. The memory of a buffer may include or comprise adjacent and/or non-adjacent pieces or blocks of memory.

Representative Procedure for Scheduled Data Blocks (e.g., by DCI)

A DL control channel may be transmitted for a data block (e.g., each data block). The DCI may include the sequence number of the PDSCH. The maximum sequence number may be fixed or configured. For a maximum number (e.g., maximum sequence number) of $2^n$ (or $2^n-1$), n bits may be used in the DCI to indicate the sequence number.

In certain representative embodiments, for a data block within a set of data blocks, whether additional data blocks are to be expected in the set or whether the data block is the last one in the set may be indicated, for example in the DCI. In certain representative embodiments, a size of a set such as a number of blocks in a set (e.g., a size of a data block set such as the number of data blocks in the data block set) may be fixed or configured and that number of blocks (e.g., data blocks) may be sent (e.g., transmitted) whether or not there may be data to fill that number of blocks. Padded data blocks (e.g., with 0s or other values) may be sent, for example, when there may not be enough data (e.g., actual data) to fill the data blocks in the data block set.

A WTRU 102 may determine that the WTRU 102 does not receive (e.g., successfully receive) a data block (e.g., a PDSCH) with a determined sequence number. The WTRU 102 may transmit a NACK (e.g., a NACK preamble) or a DTX (e.g., a DTX preamble) for the data block (e.g., PDSCH). The WTRU 102 may use a preamble and/or TF resources that may indicate a NACK or a DTX for the determined sequence number. For example, the WTRU 102 may determine the sequence number of a data block (e.g., a PDSCH) from an associated control channel that may include or contain the sequence number, for example when the WTRU 102 successfully receives the associated control channel. The WTRU 102 may attempt to receive a data block associated with the control channel. If the WTRU 102 does not successfully receive the data block, the WTRU 102 may indicate a NACK (or a DTX) for the data block. The WTRU 102 may use a preamble and/or TF resources that may indicate a NACK (or a DTX) for the determined sequence number.

In other examples, a WTRU 102 may determine that the WTRU 102 does not receive (e.g., successfully receive) a sequence number, for example based on reception of a later sequence number. For example, a WTRU 102 may receive a DL control channel indicating the sequence number x, but may not receive the sequence number x-y. The WTRU 102 may transmit a NACK or a DTX for sequence number x-y. The WTRU 102 may wait a time period (e.g., a threshold amount of time) after receiving the sequence number x before transmitting the NACK or the DTX for sequence number x-y (e.g., associated with the sequence number x-y).

FIG. 8 is a diagram illustrating a further example preamble transmission procedure to indicate a NACK.

Referring to FIG. 8, the example preamble transmission procedure 800 may include, at block 810, a WTRU 102 receiving a configuration including and/or indicating any of: one or more NACK preambles, one or more DTX preambles and/or one or more TF resources. In a first alternative, at block 820, the WTRU 102 may receive a schedule for a MT. In a second alternative, the WTRU may skip block 820 or may not receive a schedule for a MT. At block 830, the WTRU 102 may monitor for a MT. The WTRU 102 may monitor for the scheduled MT, for example for the first alternative. The WTRU 102 may, for example, monitor for a MT via a channel (e.g., a control or data channel). The channel may be associated with the MT. The WTRU 102 may monitor for the channel according to the received schedule, for example for the first alternative. The WTRU 102 may skip block 830 or may not monitor for a control channel that may be associated with the MT, for example when the WTRU 102 receives a schedule at block 820 for a data channel (e.g., a schedule for when a data channel or at least one data block may be transmitted). At block 840, the WTRU 102 may attempt to receive a data channel and/or a data block indicated (e.g., scheduled) by the control channel and/or the schedule. At block 850, the WTRU 102 may determine whether the reception of at least one data channel or data block is successful (e.g., using sequence number and/or CRC checks, among others). On condition that the WTRU 102 determines that the reception is successful, at block 860, the WTRU 102 may not send (e.g., may determine to not send) at least one of (e.g., all of) an ACK, a NACK, and/or a DTX indication to the eNode-B 160 or other network entity. On condition that the WTRU 102 determines that the reception was not successful, at block 870, the WTRU 102 may determine the sequence number (SN) of the unsuccessfully received data block and/or data channel. At block 880, the WTRU 102 may determine a NACK preamble and at least one TF resource to indicate a NACK (or a NACK for the determined SN). At block 890, the WTRU 102 may send the determined preamble on the determined TF resource or resources. At or subsequent to operating in accordance with block 860 and/or 890, the processing may stop or the WTRU may continue monitoring for the MT (e.g., a continuation of the MT) or another MT at block 830 or 840.

For example, the WTRU 102 may indicate (e.g., in a preamble transmission) the NACK to the eNode-B 160 for a data block of a MT.

Data Blocks Associated with a Representative Schedule

A set of data blocks may be transmitted according to a representative schedule (e.g., a transmission schedule). The transmission schedule may be or may include a set of time and/or frequency resources or locations (e.g., for transmission).

A DL control channel may be transmitted for (e.g., for scheduling or indicating one or more resources (e.g., TF resources) or parameters (e.g., transmission parameters) for) a set of data blocks. The transmission schedule (e.g., for a set of data blocks) and/or the number of data blocks (e.g., in a set of data blocks) may be at least one of: (1) fixed; (2) provided or configured via signaling such as multicast signaling, higher layer signaling such as RRC signaling, and/or broadcast signaling; (3) included in a DCI that may be associated with the set of data blocks; (4) configured by other control signaling; and/or (5) determined based on one or more WTRU categories, among others. For example, multicast control signaling may provide the schedule for multicast data signaling or data transmission. The schedule for the multicast control signaling may be provided by broadcast or RRC signaling.

A block (e.g., a data block) within a set of blocks (e.g., data blocks) may have an associated number (e.g., an associated sequence number). The number may be or may be a function of at least one of the following: (1) the transmission schedule; (2) a frame number (FN) (e.g., a System FN (SFN) or a Hyper FN (HFN)); (3) a subframe number (e.g., within a frame); and/or (4) the number or the maximum number of blocks (e.g., data blocks) in the set of blocks (e.g., data blocks), among others.

A WTRU 102 may attempt to receive one or more data blocks, for example according to the transmission schedule. A WTRU 102 may determine a sequence number of a data block based on at least one of: (1) the number of data blocks in the set; (2) the maximum number of data blocks in the set; (3) the transmission schedule; (4) the frame number; and/or (5) the subframe number, among others.

A WTRU 102 may determine that the WTRU 102 does not receive (e.g., successfully receive) a data block (e.g., a PDSCH) with a determined sequence number. The WTRU 102 may transmit a NACK or a DTX for the data block (e.g., the PDSCH). The WTRU 102 may use a preamble and/or TF resources that may indicate a NACK or a DTX for the determined sequence number.

Representative Procedure for a WTRU to Determine Preamble and Resources

A WTRU 102 may determine a preamble and/or one or more TF resources to use, for example to indicate a NACK and/or a DTX for a data block or a set of data blocks, based on at least one of the following: (1) a configuration, e.g., an obtained or received configuration, of one or more preambles (e.g., one or more NACK preambles and/or one or more DTX preambles); (2) a configuration, e.g., an obtained or received configuration, of TF resources (e.g., NACK TF resources and/or DTX TF resources); (3) the time period (e.g., the subframe and/or the SFN) during which the data block (e.g., the unsuccessfully received data block) was received or was to be received; (4) the start and/or the end of the time period (e.g., the subframe and/or the SFN) during which the set of data blocks (e.g., the set of data blocks including the at least one unsuccessfully received data block) was received or was to be received; (5) a data block ID such as a sequence number that may be within the set of data blocks; (6) a WTRU identifier (UE ID); (7) whether the indication is for a NACK or a DTX; and/or (8) random selection from among a set that satisfies a set of criteria such as at least one of the other criteria indicated, among others.

For example, a WTRU 102 may transmit a NACK or a DTX in time period n+k. The WTRU 102 may begin transmitting the NACK or the DTX beginning in time period n+k, for example when CE and/or repetition may be used. The time period n may be the time period in which (or for which) the WTRU 102 may attempt to receive a data block and may not have received the data block successfully (e.g., a CRC check failure). The time period n may be a last time period of a set of time periods over which the data block may be transmitted and/or received (for example the last time period of a set of repetitions that may be associated with the data block transmission). For repeated data blocks, the WTRU 102 may make the determination of successful reception or not (e.g., unsuccessful reception) when the WTRU 102 attempts to receive the data block including the set of repetitions.

The time period n may be the time period (or a last time period) in which (or for which) the WTRU 102 may attempt to receive a scheduled control channel or data channel and may determine at least one of: (1) a missed control channel; (2) a missed data channel; and/or (3) an unsuccessfully received data channel, among others. The last time period may be the last time period of a set of time periods over which the control channel or the data channel may be transmitted and/or received, for example the last time period of a set of repetitions that may be associated with the channel transmission.

A time period may be or may include one or more subframes (e.g., subframe intervals). A time period may be 1 ms (e.g., an LTE 1 ms subframe). A time period may include or comprise multiple 1 ms time periods (e.g., multiple LTE 1 ms subframes). For example, a time period may be an NB-IoT m-subframe that may include or comprise LTE subframes (e.g., 6 LTE 1 ms subframes) and/or span at least a set of LTE subframes (e.g., 6 LTE 1 ms subframes). A time period may be or may include one or more slots (e.g., timeslots), one or more symbols, one or more transmission time intervals (TTIs), and/or one or more mini-slots, among others.

The value of k may be a fixed value, such as 4, for example for FDD. The value of k may be a function of a TDD UL/DL configuration, for example when TDD is used. The value of k may be configured. The value of k may be a function of any of: (1) the data block HARQ process ID; (2) the data block sequence ID; and/or (3) the WTRU ID, among others.

Representative Procedure for NACK/DTX Transmission with CE

FIG. 9 is a diagram illustrating an additional example preamble transmission procedure to indicate a NACK with CE level repetition.

Referring to FIG. 9, the preamble transmission procedure 900 may include, at block 910, a WTRU 102 receiving a configuration including and/or indicating any of: one or more NACK preambles, one or more DTX preambles and/or one or more TF resources. At block 920, the WTRU 102 may attempt to receive a data channel and/or a data block of a MT. At block 930, the WTRU 102 may determine whether the WTRU 102 received the data channel and/or data block of the MT successfully (e.g., using sequence numbers and/or CRC checks, among others). On condition that the WTRU 102 determines that the reception is successful, at block 940, the WTRU 102 may not send an ACK or a NACK indication to an eNode-B 160 or other network entity. On condition that the WTRU 102 determines that the reception is not successful, at block 950, the WTRU 102 may determine a CE level for a NACK transmission. At block 960, the WTRU 102 may determine a NACK preamble and a TF resource or TF resources to indicate the NACK. The preamble and/or the one or more TF resources may be determined based on the determined CE level. At block 970, the WTRU 102 may send the determined NACK preamble on the determined TF resource or resources to indicate the NACK to the eNode-B 160 or other network entity. At block 980, the WTRU 102 may transmit the NACK preamble repetitions (e.g., the determined NACK preamble may be repeatedly transmitted a number of times corresponding to the NACK preamble repetitions) according to the determined CE level. At or subsequent to operating in accordance with block 940 and/or 980, the processing may stop or the WTRU 102 may attempt again to receive a data channel or a data block for the MT (e.g., a continuation of the MT) or another MT at block 920.

For example, a WTRU 102 may indicate a NACK in a preamble transmission, e.g., to an eNode-B 160 and/or another network entity, for a data block of a MT. The transmission of the preamble may use repetitions (e.g., according to a CE level). In certain representative embodiments, the CE level may be determined by the WTRU 102 and/or may be configured, e.g., by the network.

Separate or common time and/or frequency resources may be configured and/or used, for example for one or more CE levels (e.g., different CE levels). Resource configuration for the NACK and/or the DTX preamble transmission(s) may be provided for and/or associated with a CE level. For a (e.g., each) CE level, the number of repetitions may be indicated.

Separate or common preambles may be configured and/or used, for example for one or more CE levels (e.g., different CE levels). When a WTRU 102 determines a preamble and/or one or more TF resources on which to transmit the preamble, for example to indicate a NACK or a DTX, the WTRU 102 may determine the preamble and/or the TF resources from among those configured for a CE level. The CE level may be a CE level determined by the WTRU 102. The CE level may be a configured CE level. The CE level may be the maximum CE level supported in the cell.

A CE level may refer to a level of repetition. A CE level may be, may correspond to, or may be associated with a number of repetitions, for example for a signal, a channel, and/or a transmission such as a control channel, a data channel, a preamble, a data block and/or set of data blocks, among others. For a CE level, the number of repetitions may be the same or different for different signals, channels, and/or transmissions. The CE level and/or the number of repetitions that may be used by or for a WTRU 102 (e.g., for a signal, channel, or transmission) may be determined or configured, for example, to enable the WTRU 102 which may be coverage limited or located in a hard-to-reach (e.g., hard-to-communicate) location with respect to its serving network, to achieve communication success. A CE level (e.g., for a WTRU 102) may be determined (e.g., by the WTRU 102) based on a measurement (e.g., by the WTRU 102) such as an RSRP measurement. For example, a first (e.g., easy-to-reach) WTRU 102 (e.g., with a first RSRP measurement value) may transmit a signal or channel with a first number of repetitions and a second (e.g., hard-to-reach) WTRU 102 (e.g., with a second RSRP measurement value that may be lower than the first RSRP value) may transmit a signal or channel with a second number of repetitions such that the second number of repetitions is higher than the first number of repetitions. Any number of CE levels (e.g., any number of repetition levels) are possible. The CE levels and/or the number of CE levels that may be used in a network or by a cell or an eNode-B 160 may be configured (e.g., signaled) by the network, cell, and/or eNode-B 160.

The CE level that a WTRU 102 may use may be determined by the WTRU 102 based on reception of a channel such as a control channel for MT and/or a control channel for paging. The WTRU 102 may transmit repetitions of a preamble to indicate a NACK or a DTX based on the configured or determined CE level.

Representative Procedures for Power (e.g., Power Control) for NACK/DTX Transmission A WTRU 102 may use maximum power (e.g., maximum WTRU configured output power), for example when transmitting a preamble to indicate a NACK or a DTX.

WTRUs 102 that may be near to (e.g., in the vicinity of) an eNode-B 160 and/or far from the eNode-B 160 (e.g., at a cell edge) may transmit a preamble to indicate a NACK or a DTX and there may be no near-far issue, for example since the eNode-B 160 may use the reception of a NACK or a DTX to determine that at least one WTRU 102 may be transmitting a NACK or a DTX. An eNode-B 160 may not use the reception of the NACK or the DTX to determine which WTRU 102 may be transmitting the NACK or the DTX.

Representative Paging Procedure for MT (e.g., for SW Update)

Paging may be used, for example by an eNode-B 160, to indicate a MT, such as an upcoming MT, for example by the eNode-B 160. A MT may be or may include at least one of the following: (1) a data transmission; (2) a control channel transmission; (3) scheduling information for a multicast data transmission; (4) a SW and/or a FW download or upgrade; (5) data, control, and/or scheduling for a SW and/or a FW download or upgrade; (6) a SW and/or a FW version number or indication that may, for example, indicate the current version or number that may be available for download or to upgrade to.

The term "SW update" may be used to represent a SW and/or FW download, upgrade and/or update. Although, the SW update may be used as an example of a MT, other MTs are possible. Any other MT may be substituted for the SW update and may still be consistent with the disclosure herein. Version, number, and version number may be used interchangeably herein.

A WTRU 102 may be paged, for example by an eNode-B 160, to indicate a MT such as an upcoming MT. The WTRU 102 may determine a paging occasion (PO) that may be associated with its WTRU-ID and/or the MT. A PO may be a time for attempting to receive a control channel for a page and/or a data channel for a page. At or during the determined PO, the WTRU 102 may monitor for and/or receive a control channel using an RNTI for paging (e.g., a Paging-RNTI (P-RNTI)), an RNTI for a MT (MT-RNTI), and/or an RNTI for paging that may be associated with a MT (e.g., Paging MT-RNTI (PMT-RNTI)). Using a RNTI may mean that the CRC of the control channel may be scrambled with the RNTI. The control channel, e.g., the DCI, may include an indication indicating a MT such as an upcoming MT that may be for or may be related to a SW update. The indication may be, for example a MT flag or a SW update flag. The control channel may, for example provide, in lieu of or in addition to the indication, a grant (e.g., scheduling information) for a data channel that may include an indication indicating the MT.

Although a MT flag is disclosed herein as an example of a MT indication (e.g., of a MT or an upcoming MT), other examples are possible. For example, other MT indications implicit and/or explicit may be used and are still consistent with this disclosure.

In certain examples, a WTRU 102 may determine a PO and may wake up (e.g., if sleeping) for the determined PO. The WTRU 102 may receive a control channel at the PO that may be masked with a RNTI (e.g., a P-RNTI, a MT-RNTI or a PMT-RNTI, among others). The WTRU 102 may determine whether the control channel (e.g., the DL control channel, or the DCI) contains or includes a MT flag (e.g., a SW update flag). The WTRU 102 may make the determination, for example when the WTRU 102 receives (e.g., successfully receives) the control channel. If the WTRU 102 determines that the control channel or the DCI includes or contains a MT flag, the WTRU 102 may monitor for and/or may receive a MT (e.g., an upcoming MT). In certain examples, the WTRU 102 may attempt to receive a data channel that may be scheduled by the control channel, for example if the WTRU 102 receives (e.g., successfully receives) the control channel. If the WTRU 102 receives (e.g., successfully receives) the data channel and/or determines that the data channel includes or contains a MT flag, the WTRU 102 may monitor for and/or may receive a MT (e.g., an upcoming MT). The MT may be provided (e.g., transmitted) according to a schedule that may be provided by signaling such as via higher layer signaling (e.g., RRC signaling) or broadcast signaling. The WTRU 102 may use the schedule to determine when (e.g., the time such as at which frame and/or subframe) to begin receiving the MT. The WTRU 102 may begin receiving the MT at the determined time.

The WTRU 102 may continue to receive the MT, e.g., according to the transmission schedule, until the MT has completed and/or the WTRU 102 has received the completed transmission successfully. Completion of the MT may be indicated by at least one of: (1) an explicit end indication (e.g., in a data block or a control channel associated with a data block (for example in the last data block of the MT or in a control channel associated with the last data block of the MT)); (2) a sequence number that may indicate a data block is the last data block; and/or (3) higher layer signaling, among others.

A first MT, e.g., a control channel MT, may provide scheduling information for a second MT, e.g., a data channel MT.

A first MT may indicate a version and/or a number, such as a SW version or SW number. The WTRU 102 may or may not receive a second MT based on the version and/or number indicated by the first MT. For example, the first MT may indicate a SW version that may be available for download or for updating to. The WTRU 102 may receive (e.g., only receive) the second MT if the SW version and/or number is higher or later than the WTRU's current SW version and/or SW number. The decision and/or determination to receive the second MT may be made by WTRU's higher layers and may be indicated to the WTRU's physical layer.

In other examples, the SW version that may be available may be provided to a WTRU 102 in higher layer signaling such as broadcast signaling or dedicated signaling (e.g., RRC signaling), for example from an eNode-B 160. In further examples, the SW version may be provided to the WTRU 102 in a DCI, for example in a DCI that may be monitored using a RNTI such as a P-RNTI, a MT-RNTI, or a PMT-RNTI, among others.

Representative CE Level and Representative Configuration for MT

A WTRU 102 (e.g., that may be in a connected mode) may receive a configuration for MT that may enable the WTRU 102 to receive one or more MTs.

A WTRU 102 may receive one or more of the following, for example via higher layer signaling such as RRC signaling and/or broadcast signaling: (1) a RNTI such as a P-RNTI, a MT-RNTI and/or a PMT-RNTI, among others; (2) a configuration or an indication to monitor for a control channel (e.g., in a PO, using a RNTI such as a P-RNTI, a MT-RNTI and/or a PMT-RNTI, among others); (3) a configuration to monitor for a page indicating a MT such as an upcoming MT; (4) a configuration of one or more POs or information from which to determine one or more POs, that the WTRU 102 may monitor for a page that may indicate a MT such as an upcoming MT, for example using an RNTI such as a P-RNTI, a MT-RNTI and/or a PMT-RNTI, among others; and/or (5) a CE level or number of repetitions that may be used for reception of a MT, among others.

A WTRU 102 (e.g., a connected mode WTRU 102) may monitor for a RNTI such as a P-RNTI, a MT-RNTI or a PMT-RNTI, among others, for example when configured to do so. A WTRU 102 may monitor one or more POs for a page that may indicate a MT such as an upcoming MT, for example when configured to do so. An eNode-B 160 may be aware of the CE level of a WTRU 102 that is in a connected mode.

A WTRU 102 (e.g., a connected mode WTRU 102) may receive or may be configured with a CE level or a number of repetitions. The WTRU 102 may receive a linkage between a CE level and a number of repetitions. CE level and number of repetitions may be used interchangeably herein.

A WTRU 102 (e.g., a connected mode WTRU 102) may be informed and/or configured (e.g., by an eNode-B 160) with a CE level that the WTRU 102 may use for reception of a MT. The WTRU 102 may determine or expect the MT to be transmitted with at least that CE level, e.g., with at least the number of repetitions for that CE level. The WTRU 102 may receive or attempt to receive a MT with a number of repetitions. The number of repetitions may be less than or equal to the number of repetitions corresponding to the informed and/or configured CE level. A WTRU 102 may stop combining repetitions when the WTRU 102 successfully receives a transmission (e.g., the MT).

A WTRU 102 (e.g., that may be in idle mode) may receive a configuration for MT that may enable the WTRU 102 to receive one or more MTs. An eNode-B 160 may not know the CE level (e.g., the current CE level) of a WTRU 102 that is in idle mode.

A WTRU 102 may receive one or more of the following, for example via higher layer signaling such as broadcast signaling (e.g., in system information): (1) a RNTI such as a P-RNTI, a MT-RNTI and/or a PMT-RNTI, among others; and/or (2) a configuration of one or more POs or information from which to determine one or more POs, that the WTRU 102 may monitor for a page that may indicate a MT such as an upcoming MT (for example using an RNTI such as a P-RNTI, a MT-RNTI and/or a PMT-RNTI, among others).

A WTRU 102 may monitor for a RNTI such as a P-RNTI, a MT-RNTI and/or a PMT-RNTI, among others. A WTRU 102 may monitor one or more POs for a page that may indicate a MT such as an upcoming MT. A WTRU 102 (e.g., an idle mode WTRU 102) may determine the CE level to use for a MT based on the CE level with which the WTRU 102 received the DCI using an RNTI such as the P-RNTI, the MT-RNTI and/or the PMT-RNTI, among others.

A WTRU 102 in idle mode may connect, e.g., request an RRC connection, to receive a MT (e.g., a MT of a particular type) such as a SW update. For example, a WTRU 102 may determine that a SW version later than the WTRU's current SW version may be available. A WTRU 102 may, for example, determine the available version from at least one of: (1) a DCI that may use (e.g., may be masked or scrambled by) a RNTI, such as a P-RNTI, a MT-RNTI and/or a PMT-RNTI, among others; (2) broadcast signaling; and/or (3) multicast signaling, among others. At least one of the P-RNTI, the MT-RNTI, and/or the PMT-RNTI may be a fixed value and/or a value otherwise known or determined by a WTRU 102.

Masked and scrambled may be used interchangeably herein. When a control channel or DCI is masked or scrambled by a RNTI, the CRC of the control channel or DCI may be scrambled by the RNTI.

Multicast signaling that may provide a SW version and/or scheduling information may be transmitted using a CE level (e.g., that may be sufficient for at least some (e.g., and/or all) WTRUs 102), for example using the worst case CE level supported by the cell.

In certain examples, a WTRU 102 may request an RRC connection with a cause indicating a MT (e.g., of a particular type) and/or a SW update. The request may indicate to an eNode-B 160 or other network entity that the WTRU 102 may, or may want to, receive the MT and/or the SW update. In certain examples, a WTRU 102 may send another message or request that may indicate the cause of the message or request may be a MT (e.g., of a particular type) and/or a SW update that the WTRU 102 may, or may want to, receive.

The WTRU 102 may perform a random access (RA) procedure such as a contention based RA procedure. The WTRU 102 may choose a starting CE level for the RA procedure based on a measurement (e.g., a RSRP measurement). The message or request (e.g., the RRC connection request) may be transmitted as part of the RA procedure. The eNode-B 160 may use or obtain the CE level of the WTRU 102 from the RA procedure. The eNode-B 160 may pass and/or forward the cause (e.g., SW update) to the network, e.g., the MME 162.

The WTRU 102 may determine the WTRU's CE level from the level at which the RA procedure is successful.

An eNode-B 160 may put a WTRU 102 in Suspend mode. In certain examples, the WTRU 102 may receive a MT while in Suspend mode. A WTRU 102 (e.g., in Suspend mode) may monitor the WTRU's POs and may receive a page that may indicate the MT. In response to the page, the WTRU 102 may monitor for the MT. In certain examples, the WTRU 102 may exit Suspend mode, e.g., perform a RA transmission with its resume ID to exit Suspend mode and may resume operation in a connected mode. The WTRU 102 may receive the MT in a connected mode.

Representative CE Levels for MT Based on WTRU ID or Intended WTRU Recipient(s)

A network node (e.g., an eNode-B 160, a MME 162, and/or another node) may know and/or may determine at least one of the following (e.g., for one or more (e.g., all) connected mode WTRUs 102 that may be in a multicast group): (1) a SW revision and/or (2) a CE level that may be appropriate and/or needed.

A network node may want and/or desire to perform a SW update. A network node may inform an eNode-B 160 that the network node may perform a SW update. The network node may inform the eNode-B 160 of one or more WTRUs 102 to which to direct the SW update. The network node may indicate a WTRU 102 to an eNode-B 160 by a WTRU ID (or a part of a WTRU ID) that may be at least one of: (1) a unique identifier; (2) an International Mobile Subscriber Identity (IMSI); (3) a Temporary IMSI (TIMSI); and/or (4) a System Architecture Evolution (SAE) TIMSI (S-TIMSI), among others.

The eNode-B 160 may receive an indication that the network may perform a SW update. The eNode-B 160 may receive a WTRU ID for one or more WTRUs 102 (e.g., that may receive or may be the intended recipients of the SW update). The eNode-B 160 may determine a CE level (e.g., an optimized CE level and/or a worst case CE level) that may be used for the SW update, for example based on the CE levels of the intended WTRUs 102.

The eNode-B 160 may use the determined CE level as the CE level for the control channel and/or the data channel for the SW update MT. The eNode-B 160 may use the determined CE level for the CE level of the control channel and/or the data channel for paging, for example for paging one or more WTRUs 102 to inform the one or more WTRUs 102 of an upcoming MT such as for the SW upgrade. The eNode-B 160 may receive the MT schedule from a network node and may schedule the transmission. The eNode-B 160 may page one or more WTRUs 102 to inform the one or more WTRUs 102 of the upcoming MT.

Representative Request for Interest in SW Download

A WTRU 102 may receive a request for an interest indication for a MT and/or SW update. The request may be sent by and/or received from an eNode-B 160. The request may be provided by higher layer signaling such as RRC signaling, for example to a connected mode WTRU 102. The request may be provided in a page, for example to idle mode WTRUs 102 and/or connected mode WTRUs 102 that may be using discontinuous reception (e.g., DRX). The request may include a SW version that may be available.

A WTRU 102 may reply to the request. A WTRU 102, for example a connected mode WTRU 102, may indicate that the WTRU 102 may be interested to receive the MT or the SW upgrade, for example if the available version is later than the WTRU's current version. The WTRU 102 may indicate the WTRU's current version in the reply. The WTRU 102 may send the reply via signaling (e.g., the RRC signaling). The request and/or the reply may be in NAS signaling. The NAS signaling may be encapsulated in the RRC signaling.

A WTRU 102, for example an idle mode WTRU 102, may respond to a page by transmitting a preamble and/or by initiating a RA procedure. The WTRU 102 may indicate in a message that may be part of the RA procedure that the WTRU 102 may be interested to receive a SW update. In certain examples, the WTRU 102 may request an RRC connection. The WTRU 102 may indicate a cause, e.g., for the RRC connection, as MT (e.g., of a particular type), a SW update, interested in a MT (e.g., of a particular type), and/or interested in a SW update. In certain examples, the WTRU 102 may send a message and/or request (e.g., a different or separate message or request from a RRC connection request or from a message that may be part of a RA procedure) that may indicate that the cause of the message or request may be a MT (e.g., of a particular type), a SW update, interested in a MT (e.g., of a particular type), and/or interested in a SW update.

In other representative embodiments, one or more preambles and/or TF resources may be configured and/or used to indicate interest in receiving a SW upgrade. Configuration may be provided by signaling such as broadcast signaling, for example from an eNode-B 160. A WTRU 102 may determine a preamble and a set of one or more TF resources for transmission of the preamble, for example to indicate the WTRU's interest in receiving a SW update.

The WTRU 102 may indicate the WTRU's interest in receiving the SW update, for example by transmitting the determined preamble on the determined set of resources.

Representative Request for Transmission

A request for a transmission may be provided and/or used. A WTRU 102 may request a transmission, for example from an eNode-B 160. The transmission (e.g., requested transmission) may be a broadcast transmission and/or a MT that, for example, may be received or intended to be received by at least one (e.g., more than one) WTRU 102. The transmission (e.g., requested transmission) may be a dedicated transmission that, for example, may be received or intended to be received by at least one (e.g., only one) WTRU 102.

A WTRU 102 may request a transmission such as a transmission of system information (SI) or a transmission of a SW update.

A WTRU 102 may request a transmission and/or receive a requested transmission while in idle mode and/or connected mode (e.g., RRC connected mode).

Representative SI

SI may be provided (e.g., transmitted) by an eNode-B 160. SI may be received by one or more WTRUs 102.

The SI may be provided in one or more SI messages, SI blocks (SIBs), and/or master information blocks (MIBs), among others. At least some SI may be provided in response to a request for transmission. SI and SIB transmission are used herein as non-limiting examples of a transmission or TType that may be requested, broadcast, multicast, and/or provided via dedicated signaling. Another transmission or TType may be used and still be consistent with the examples and embodiments described herein.

In certain representative embodiments, at least some SI may have a schedule, for example a regular or periodic schedule. At least some SI may be provided or transmitted regularly or periodically, for example according to a schedule that may be configured, determined, and/or known. At least some SI may be provided or transmitted, for example according to a schedule, when requested (e.g., only when requested) and/or when a transmission (e.g., of the SI) may be active or activated.

At least some SI may be scheduled for transmission at least once within a transmission period. The at least some SI may be updated on boundaries of a transmission period. A transmission period may be an SI modification period. A schedule may be used to determine when a transmission period may begin and/or occur.

The SI may provide and/or indicate information regarding a cell, a system, and/or a network, among others. The SI, for example for a cell or that may be provided by a cell or an eNode-B 160 of a cell, may include information regarding (e.g., that may enable access to and/or communication with) the cell, another cell (e.g., an aggregated cell, a neighboring cell, and/or a small cell, among others.), the system or network to which the cell belongs, and/or the system or network to which another cell belongs.

Representative Procedures for WTRU to Indicate Request for Transmission (e.g., Using a Preamble)

A preamble may be provided and/or used for indicating a request for a transmission such as a broadcast transmission.

In certain examples, a WTRU 102 may transmit a preamble, such as a PRACH preamble, among others, to indicate a request for a transmission. The terms transmission request (tx-request) and request for transmission may be used interchangeably herein.

A first preamble may be used for a tx-request from a first WTRU 102 or a first set or group of WTRUs 102. A second preamble may be used for a tx-request from a second WTRU 102 or a second set or group of WTRUs 102. The first and second preambles may be the same or different.

A first TF resource (or set of TF resources) may be used for a tx-request from a first WTRU 102 or a first set or group of WTRUs 102. A second TF resource (or set of TF resources) may be used for a tx-request from a second WTRU 102 or a second set or group of WTRUs 102. The first and second TF resources (or sets of TF resources) may be the same or different.

A set or group of WTRUs 102 may, for example be grouped based on or according to a CE level. The set or group to which a WTRU 102 may belong may be determined based on or according to a CE level, e.g., the CE level of the WTRU 102.

An eNode-B 160 may provide (e.g., via configuration that the eNode-B 160 may signal) one or more preambles (e.g., tx-request preambles) and/or one or more TF resources on which to transmit the one or more preambles, for example to indicate a tx-request.

An eNode-B 160 may receive at least one preamble that may indicate a tx-request. The eNode-B 160 may transmit a transmission (e.g., a broadcast transmission), for example in response to the tx-request. For example, a WTRU 102 may transmit a preamble to indicate a request for transmission of SI, one or more SIBs, one or more MIBs and/or a set of SIBs, among others. The eNode-B 160 may transmit SI, one or more SIBs, one or more MIBs, and/or a set of SIBs, for example in response to a request (e.g., a corresponding request).

In certain examples, a WTRU 102 may transmit a preamble, a signal, a sequence, and/or a channel to indicate a request for a SW update. An eNode-B 160 may transmit a SW update, for example in response to a request for a SW update.

Representative Procedures for WTRU to Indicate Request for TType

In certain representative embodiments, a WTRU 102 may indicate a request for a particular TType. There may be at least one TType. A TType may comprise or include at least one of: a broadcast transmission, a MT, and/or a dedicated transmission. A TType may comprise or include transmission of at least one of: SI, a set of SI messages, a set of SIBs, at least one MIB, and/or a SW update. A TType may comprise or include transmission of at least one of: a reference signal, a measurement signal, and/or a synchronization signal.

A preamble and/or a TF resource (or set of TF resources) may be configured for and/or correspond to a TType. For example, a first preamble and/or a first TF resource (or set of TF resources) may be configured for and/or correspond to a first set of SIBs. A second preamble and/or a second TF resource (or set of TF resources) may be configured for and/or correspond to a second set of SIBs.

A WTRU 102 may determine a preamble and/or a TF resource (or set of TF resources) that may be configured for and/or correspond to a TType. The WTRU 102 may transmit the determined preamble to request transmission of the TType. The WTRU 102 may transmit on the determined TF resource (or set of TF resources) to request transmission of the TType.

Representative Procedures for Response to Transmission Request

A TType may be transmitted, e.g., by an eNode-B 160, in response to a tx-request, e.g., a tx-request for a TType. The TType, for example, may be transmitted in a transmission period that may be after the tx-request, e.g., after a receipt of the tx-request. The TType, for example, may be transmitted in the next transmission period after the tx-request and/or in a predetermined period after the tx-request (e.g., a subsequent transmission period).

On-demand activation may refer to activating a transmission or TType in response to a request or a need for the transmission or TType.

A WTRU 102 may monitor for, receive, and/or expect to receive a TType after sending a tx-request for the TType. For example, a WTRU 102 may monitor for, receive, and/or expect to receive a TType in a transmission period (e.g., the next transmission period) after sending a tx-request for the TType.

Monitoring for and/or receiving a TType may include monitoring for and/or receiving at least one control channel and/or at least one data channel that may be associated with the TType. The terms monitoring and monitoring for may be used interchangeably herein.

Representative Procedures Associated with CE Level

Time and/or frequency resources (e.g., separate time and/or frequency resources) may be configured and/or used, for example, for one or more CE levels. A resource configuration for tx-request preamble transmission may be provided for and/or associated with a CE level. For a CE level, a number of repetitions may be configured and/or indicated. A CE level may be or may correspond to a number of repetitions. CE level and number of repetitions may be used interchangeably herein. Preambles (e.g., separate preambles) may be configured and/or used, for example, for one or more CE levels.

When a WTRU 102 determines a preamble and/or one or more TF resources on which to transmit the preamble, for example to indicate a tx-request, the WTRU 102 may determine the preamble and/or TF resources from among those configured for a CE level. The CE level may be a CE level determined by the WTRU 102. The CE level may be a configured CE level. The CE level may be the maximum CE level supported in the cell.

The CE level may be determined by the WTRU 102 based on a measurement or based on reception (e.g., successful reception) of a channel (e.g., a control channel for broadcast or MT and/or a control channel for paging).

The WTRU 102 may transmit repetitions of a preamble to indicate a tx-request based on the configured or determined CE level. In certain representative embodiments, the CE level may be configured.

A WTRU 102 may receive or expect to receive a requested transmission with a CE level (e.g., a number of repetitions) that may correspond to (or be greater than) the CE level (e.g., the number of repetitions) the WTRU 102 used to transmit the request.

Reception with a CE level or number of repetitions may include combining (e.g., soft combining) repetitions of a transmission to receive (e.g., successfully receive) the transmission.

Representative Procedures Associated with Power for Tx-Request Transmission

A WTRU 102 may use a maximum power (e.g., a maximum WTRU configured output power), for example when transmitting a tx-request or a preamble to indicate a tx-request. In certain representative embodiments, a WTRU 102 may determine a power to use for transmission of a tx-request based on at least one of: a measurement, reception of a SI (e.g., a MIB and/or a SIB), and/or reception of a channel such as a control channel for broadcast, multicast, or paging.

Representative Procedures for Handling of Non-Receipt of Requested TType

A WTRU 102 may perform at least one action (e.g., a non-receipt action) when the WTRU 102 does not receive (e.g., successfully receive) a TType (e.g., SI or a set of SIBs) or at least part of a TType (e.g., a subset of a set of SIBs), for example after requesting transmission of the TType.

A WTRU 102 may perform at least one action (e.g., a non-receipt action) conditioned on a lack of reception (e.g., successful reception) in at least one of the following: (1) a window of time that may be configured, signaled, and/or predetermined; (2) a transmission period after sending the tx-request, such as the next transmission period, a subsequent transmission period, a predetermined transmission period or a signaled transmission period; (3) a number of transmission periods after sending the request such as the next transmission period (or a subsequent transmission period) and one or more additional periods where the number and/or scheduling of transmission periods may be configured, predetermined or signaled.

A WTRU 102, for example, may perform at least one of the following actions (e.g., non-receipt actions) including: (1) send another tx-request for the TType; (2) send a tx-request for a part of the TType (e.g., a part of the TType that was not received); (3) increase power (e.g., determine and/or use an increased power) for sending a tx-request; (4) determine and/or use another (e.g., higher) CE level or number of repetitions for sending a tx-request; (5) determine and/or use a preamble and/or TF resources for another (e.g., higher) CE level; and/or (6) determine and/or use another (e.g., higher) CE level or number of repetitions for monitoring and/or receiving a TType, among others.

Representative Paging for Upcoming Transmission

Paging may indicate (e.g., may be used by an eNode-B 160 to indicate) a transmission (e.g., a TType) such as an upcoming transmission (e.g., TType), for example by the eNode-B 160. For example, paging may indicate an SI transmission (e.g., an upcoming SI transmission). Paging may indicate whether the SI transmission may include updated information (e.g., an SI update and/or SI modification), for example since (e.g., relative to) a previous SI transmission.

A WTRU 102 may determine a paging occasion (PO) that may be associated with its WTRU-ID and/or at least one TType. At or during the determined PO, the WTRU 102 may monitor and/or receive a control channel using a RNTI. The RNTI may, for example be a RNTI for paging (e.g., P-RNTI), an RNTI for a TType, or an RNTI for paging that may be associated with a TType such as a TType that may be requested.

The control channel (e.g., the DCI) may include at least one indication (e.g., tx-indication) that may be related to a transmission (e.g., an upcoming transmission). A tx-indication may indicate that a transmission (e.g., a TType) such as an upcoming transmission (e.g., an upcoming TType) may be transmitted or may occur. A tx-indication may provide information regarding a transmission that may be transmitted or may occur. The transmission may have been requested by at least one WTRU 102. In certain representative embodiments, the control channel may (e.g., in addition or alternatively) provide a grant (e.g., scheduling information) for a data channel that may include at least one tx-indication.

A tx-indication may include an identification of a TType (or a part of a TType) that may be transmitted, for example in an upcoming transmission period. A tx-indication, for example, may indicate the transmission (e.g., the upcoming transmission) of SI and/or an update (e.g., an upcoming update) of SI, for example in an upcoming (e.g., a next or subsequent) transmission period. For example, a tx-indication may provide at least one of: (1) an indication that some SI (e.g., at least one or more SIBs) may be transmitted, for example in an upcoming transmission period; (2) an indication that some SI (e.g., at least one or more SIBs) may be updated, for example in an upcoming transmission period; (3) an indication of which SI (e.g., which one or more SIBs) may be transmitted and/or updated, for example in an upcoming transmission period; and/or (4) an indication of at least one SIB (e.g., an indication of the number and/or identity of at least one SIB) that may be transmitted and/or updated, for example in an upcoming transmission period, among others.

In certain examples, a bit or a set of bits may be used to indicate that some SI (e.g., a set of SIBs) may be transmitted. A bit or bits (e.g., a separate bit or bits) may be used to indicate whether or not the SI (e.g., the transmitted SI) may be changed (e.g., modified).

In certain examples, an unchanged value tag may be used to indicate that SI (e.g., some SI) may be transmitted and unchanged (e.g., from the last transmission of SI).

In certain representative embodiments, an upcoming transmission period may be a next transmission period or a different transmission period.

A WTRU 102 may determine whether to monitor for and/or receive a TType (or a part of a TType) for example in a transmission period (e.g., an upcoming transmission period) based on one or more tx-indications that may be received in a channel (e.g., a control channel that may be a paging control channel and/or a data channel that may be a paging data channel). A WTRU 102 may monitor for and/or receive a TType (and/or an indication of a TType) according to a schedule that may be configured, signaled, determined and/or known.

For example, a WTRU 102 may monitor for and/or receive SI or a SIB when a tx-indication indicates or may indicate that at least the SI or the SIB is to be and/or may be transmitted.

A WTRU 102 may determine whether to monitor for and/or receive SI (e.g., one or more SIBs), for example in a transmission period (e.g., an upcoming transmission period) based on one or more tx-indications. A WTRU 102 may monitor for and/or receive SI or a SIB according to a schedule that may be configured, signaled, determined and/ or known.

A WTRU 102 may not monitor for and/or may not receive SI or a SIB when a tx-indication indicates (e.g., and/or may indicate) that the SI or the SIB may not be transmitted. A WTRU 102 may not monitor for and/or may not receive SI or a SIB when there is or may be no tx-indication that indicates that the SI (e.g., at least the SI) or the SIB (e.g., at least the SIB) may be transmitted. A WTRU 102 may not monitor for and/or may not receive SI or a SIB when a tx-indication indicates or may indicate that the SI or the SIB is unchanged or may be unchanged (e.g., not updated), for example when the WTRU 102 has (e.g., already has or has already received), the SI or the SIB, for example a current version of the SI or the SIB.

In certain examples, a WTRU 102 may determine a PO and may wake up (e.g., if appropriate and/or sleeping) for the determined PO. The WTRU 102 may receive a control channel at the PO that may be masked with a RNTI. The WTRU 102 may determine whether the control channel, e.g., DL control channel, or DCI contains or includes a tx-indication. The WTRU 102 may make the determination, for example when it successfully receives the control channel. If the WTRU 102 determines that the control channel or the DCI contains or includes a tx-indication, the WTRU 102 may determine whether to monitor for and/or receive the transmission, for example in the upcoming transmission period. The determination may be based on the tx-indication.

In certain representative embodiments, the WTRU 102 may attempt to receive a data channel that may be scheduled by the control channel, for example if the WTRU 102 receives (e.g., successfully receives) the control channel. If the WTRU 102 receives (e.g., successfully receives) the data channel and/or determines that the data channel contains or includes a tx-indication, the WTRU 102 may determine whether to monitor for and/or receive the transmission, for example in the upcoming transmission period. The determination may be based on the tx-indication.

A TType may be transmitted and/or provided according to a schedule that may be provided by signaling such as higher layer signaling (e.g., RRC signaling) or broadcast signaling.

The WTRU 102 may use the schedule to determine when (e.g., a time such as at which frame and/or subframe) to begin receiving the TType. The WTRU 102 may begin receiving the TType at the determined time.

A WTRU 102 may monitor for a page that may include (e.g., in an associated control or data channel) a tx-indicator, for example after sending a request for a TType. The WTRU 102 may monitor for the page that may be associated with the TType.

A WTRU 102 may perform at least one non-receipt action when the WTRU 102 does not receive a page, for example a page that may include a tx-indication that may indicate an upcoming transmission for a requested TType.

Representative Paging CE Level and Transmission CE Level

A first CE level (e.g., number of repetitions) may be used for a paging transmission. A TType that may be indicated by a paging transmission (e.g., via a tx-indicator) may use a second CE level. The association and/or correspondence of the first CE level and the second CE level may be configured, signaled, determined and/or predetermined.

The first CE level may be the CE level of the paging control channel and/or the data channel (e.g., the paging data channel). The second CE level may be the CE level of the transmission (e.g., the indicated TType transmission) control channel and/or the data channel (e.g., the transmission data channel).

A WTRU 102 may receive a page that may contain or include a tx-indicator. The WTRU 102 may receive the page with a number of repetitions that may be up to a first number of repetitions. The WTRU 102 may receive the indicated transmission with a number of repetitions that may be up to a second number of repetitions. The WTRU 102 may determine the second number of repetitions from the association/correspondence between the first and second number of repetitions.

Representative Connection Establishment and Transmission Request

A WTRU 102 may use a RA procedure and/or operation to request a TType, for example to request transmission of SI (e.g., one or more SIBs). A WTRU 102 may perform a RA procedure/operation such as a contention based RA procedure, for example to request connection establishment (e.g., a RRC connection establishment). A WTRU 102 may use a preamble and/or TF resource that may be configured and/or used for a combined connection request (e.g., a RRC connection request) and a tx-request for a TType. For example, a WTRU 102 may determine a preamble and/or one or more TF resources that may be configured and/or used for a combined connection request and a tx-request for a TType. The WTRU 102 may transmit the determined preamble on the determined one or more TF resources.

An eNode-B 160 may respond to the request with an RA response (e.g., RAR) that may include a TType (e.g., the requested TType).

A RAR may include and/or indicate a TType (e.g., a requested TType). For example, the RAR may include some SI. A RAR may comprise or include a WTRU-specific part and a common part. The WTRU-specific part (or preamble specific part) may include at least one of: an indication of a received preamble, a timing advance, an UL grant, and/or a temporary C-RNTI, among others. The WTRU-specific part may be used by a WTRU 102 that may have sent the indicated preamble. The common part may include a TType (e.g., include SI) that may be received and/or used by at least one (e.g., more than one) WTRU 102 that may have sent a preamble (e.g., a preamble to request the TType).

A WTRU 102 may include a tx-request in a message that may be part of a RA procedure. For example, a tx-request may be included in one of the UL messages of an RA procedure such as msg3, a connection request, msg5, and/or a connection setup complete (e.g., a connection setup complete message). A tx-request indication may be incorporated into the establishment cause. The indication may be incorporated into the header (e.g., a MAC header and/or a RLC header, among others) of an UL message of an RA procedure.

An eNode-B 160 may transmit and/or a WTRU 102 may receive a TType that may be requested, for example in a message that may be part of a RA procedure. For example, a requested TType may be included as part of a connection setup message.

Representative ACK Procedure for Requested Transmission

In certain representative embodiments, methods, operations, procedures and apparatus may be implemented for on-demand system information and/or on-demand broadcast or multicast transmission(s).

In certain representative embodiments, methods, operations, procedures and apparatus may be implemented, for an eNode-B ACK of a broadcast/multicast request, using any of the following to indicate the ACK itself and/or what is being ACKed: DCI scrambling (e.g., RNTI based) and/or DCI contents, PDSCH (e.g., RAR), PHICH, PHICH-like, and other configured resources.

In certain representative embodiments, methods, operations, procedures, parameters and apparatus may be implemented, to indicate to a WTRU 102 and/or for the WTRU 102 to know or determine, how long the broadcast/multicast (B/M) transmission may or will be present. The B/M parameters may use a fixed and/or configured value for and/or to indicate: (1) a number of transmissions in a transmission period; (2) a total number of transmissions that may span one or more transmission periods, for example for an activation; (3) a number of transmission periods (e.g., the number of configured transmission periods); and/or (4) a number of cycles (e.g., during which the transmission may be repeated).

A request for a broadcast transmission or a MT (e.g., via a request for a TType) or a request for a TType may be acknowledged. The acknowledgement (ACK) may be transmitted by an eNode-B 160 and/or received by a WTRU 102. The ACK may indicate any of: (1) that a request was received, (2) what request was received, (3) for what TType a request was received, and/or (4) what TType may be transmitted, for example at a future time that may be configured and/or known, among others.

An ACK is referred to herein as an example (e.g., non-limiting example) of an indication. Indications, other than an ACK, may be used and still be consistent with this disclosure.

For example, a WTRU 102 may receive at least one indication (e.g., from an eNode-B 160) that may indicate that a request for a MT or a broadcast transmission (e.g., TType) was received (e.g., by the eNode-B 160). An indication may be or may include an ACK. An indication may provide information regarding the request. For example, an indication may identify and/or provide information regarding what or which request (or group and/or set of requests) was/were received. An indication may identify what or which request (or group and/or set of requests) is being acknowledged. In certain examples, an indication may identify and/or provide information regarding a TType that was requested and/or a TType that is being acknowledged.

An indication (e.g., of a request reception) may be received by a first WTRU 102. The request may have been from the first WTRU 102 or from a second WTRU 102.

In an example, a first WTRU 102 may request transmission using and/or of a TType (e.g., SI, a set of SIBs, and/or a SW update). The WTRU 102 may make the request by transmitting a signal, channel and/or preamble on (e.g., on a set of) time and/or frequency resources. Request-resources may be resources that may be used for making the request. The WTRU 102 may transmit the request, for example, to an eNode-B 160.

A WTRU 102 (e.g., the first WTRU and/or a second WTRU) may receive an indication (e.g., an ACK), for example from an eNode-B 160. The indication may indicate that a request (e.g., the request by the first WTRU 102) was received and/or that a requested transmission (e.g., requested by the first WTRU 102) may be made, for example, at a time X or at least a time X after (e.g., after a time at which) the request was made or the indication was received. The indication may indicate that a request (e.g., the request by the first WTRU 102) was received and/or that a requested transmission (e.g., requested by the first WTRU 102) may be made, for example, in an upcoming (e.g., next) transmission period, for example of the requested and/or acknowledged TType. X, for example, may be in TTIs, subframes, slots, mini-slots, and/or symbols. X may be configured (e.g., by an eNode-B 160), determined (e.g., by the WTRU 102), and/or otherwise known (e.g., by the WTRU 102).

An indication may be transmitted (e.g., by an eNode-B 160) and/or received by a WTRU 102. An indication may indicate any of the following: (1) request reception or ACK; (2) a plan and/or an intent to transmit, e.g., at least one TType; (3) a TType, e.g., associated with the request reception, ACK, the plan to transmit and/or the intent to transmit; and/or (4) at least one parameter that may be related to a transmission time of a TType (e.g., the requested TType, the ACKed TType, the TType that the eNode-B 160 may be planning or intending to transmit), among others.

The TType may be the requested TType, an acknowledged TType, and/or a TType that may be intended for transmission or indicated as intended for transmission.

Any of the following may be used to provide an ACK and/or an indication: (1) control information (e.g., downlink control information (DCI)) contents; (2) control information (e.g., DCI) scrambling, for example DCI CRC scrambling with a RNTI; (3) a RNTI; (4) data channel (e.g., PDSCH) contents and/or payload, for example, a random access response (RAR) data channel contents and/or payload; and/or (5) PHICH and/or PHICH-like resources and/or other configured resources, among others.

An ACK and/or indication may be transmitted (e.g., by an eNode-B 160) and/or may be received by a WTRU 102 in any of the following ways: (1) in control information (e.g., in the contents of the control information) such as in DL control Information (DCI); (2) via DCI scrambling (e.g., DCI CRC scrambling with a RNTI); (3) in a data channel (e.g., in the contents and/or payload of the data channel) such as a PDSCH, for example in a RAR PDSCH; and/or (4) via PHICH or PHICH-like resource and/or other configured resources, among others.

One or more PHICH resources may be reserved, configured, predetermined, and/or used for an ACK and/or an indication. For example, a PHICH group ($n_{PHICH}^{group}$) may be reserved and/or configured for an ACK and/or an indication of one or more TTypes. Within a PHICH group, one or more sequences may be used, configured, and/or predefined for one or more TTypes. One or more sequences (e.g., each sequence) may be associated with a TType. Table 1 shows an example TType indication using PHICH resources, such that a PHICH group (e.g., $n_{PHICH}^{group}=1$) may be reserved or used for a TType indication and multiple sequences may be associated with multiple TTypes.

A WTRU 102 may attempt to receive an associated PHICH resource or resources for a TType for which and/or that the WTRU 102 requested.

A WTRU 102 may receive and/or attempt to decode a PDSCH, which may include the TType for which the WTRU 102 requested if or on condition that the WTRU 102 received an ACK for the TType.

TABLE 1

An example of TType Indication using PHICH resources

| Transmission Type Indicator | | | |
|---|---|---|---|
| $n_{PHICH}^{group}$ | $n_{PHICH}^{seq}$ | HI | Configuration |
| 1 | 0 | 0 | DTX for a first TType |
| 1 | 0 | 1 | ACK for a first TType |
| 1 | 1 | 0 | DTX for a second TType |
| 1 | 1 | 1 | ACK for a second TType |
| 1 | 2 | 0 | DTX for a third TType |
| 1 | 2 | 1 | ACK for a third TType |

DCI may be referred to herein as an example (e.g., a non-limiting example) of control channel information.

A WTRU 102 may transmit a request for a TType, for example using request-resources. A first WTRU 102 may monitor for an ACK and/or an indication that may indicate that a request (e.g., from the first WTRU 102 or a second WTRU 102) for a TType was received. The first WTRU 102 may monitor for an ACK and/or an indication that may indicate that a TType (e.g., a requested TType) may be transmitted. A WTRU 102 (e.g., the first WTRU 102) may determine that a request (e.g., for a TType) was received and/or that a TType may be transmitted, for example based on a reception of an ACK and/or an indication. A WTRU 102 (e.g., the first WTRU 102) may receive the TType, for example based on the determination.

A WTRU 102 may monitor for an ACK and/or an indication to determine whether a TType (e.g., a TType associated with the ACK and/or the indication) was requested by another WTRU 102. A WTRU 102 may not request a TType, for example when the WTRU 102 determines that the TType was requested (e.g., by another WTRU 102) and/or that the TType was acknowledged (e.g., by an eNode-B 160). A WTRU 102 may receive a TType after (e.g., based on) determining that the TType was requested (e.g., by another WTRU 102) and/or acknowledged (e.g., by an eNode-B 160).

Representative Use of a Control Channel and a RNTI

A DCI may include (e.g., explicitly include) an ACK and/or an indication. A WTRU 102 may monitor for a DCI that may provide an ACK and/or an indication (e.g., the ACK). A DCI may be scrambled (e.g., a CRC of the DCI may be scrambled) with a cell-specific or WTRU-specific RNTI.

A RNTI may be configured for and/or associated with any of: (1) a TType (e.g., a requested TType); and/or (2) a request mechanism, e.g., the mechanism that may be used for requesting a TType, such as a random access procedure, among others. For example, a WTRU 102 may use a random access procedure to request a TType. A WTRU 102 may monitor for a random access (RA)-RNTI, for example to receive an ACK.

A WTRU 102 may monitor for a RNTI (e.g., a DCI scrambled with an RNTI). When or on condition that the WTRU 102 receives the RNTI for which it may be monitoring, the WTRU 102 may obtain an ACK and/or an indication from the associated DCI (e.g., from the contents of the DCI). When or on condition that the WTRU 102 receives the RNTI for which it may be monitoring, the WTRU 102 may obtain an ACK and/or an indication from the data channel that may be scheduled by the associated DCI.

A DCI including an ACK or an indication may be monitored, for example, in a certain location of a common search space and/or a WTRU-specific search space. The location of the common search space and/or the WTRU-specific search space may be one or more decoding candidates (and/or one or more PDCCH candidates) and/or determined based on the TType for which the WTRU 102 requested.

One or more TTypes may be used and/or configured and a TType (e.g., each TType) may be associated with a location of a common search space and/or a WTRU-specific search space. A WTRU 102 may monitor the associated location of a common search space and/or a WTRU-specific search space after sending a request for a TType.

One or more specific DL control channel resources (e.g., one or more control channel elements (CCEs) and/or one or more resource element groups (REGs)) may be used for an ACK and/or an indication. For example, one or more CCEs and/or one or more REGs may be reserved and/or used for an ACK or an indication. For example, CCEs and/or REGs (e.g., each CCE and/or each REG) may be associated with a TType. A WTRU 102 may attempt to decode an associated CCE or REG after sending a request for a TType.

A predefined and/or known sequence may be transmitted in the associated CCE and/or the associated REG.

An energy level of the associated CCE and/or the associated REG may determine a status of the ACK and/or the indication.

In certain examples, a RNTI may be associated with a TType. A WTRU 102 may monitor for a RNTI. Based on receipt of the RNTI for a TType, the WTRU 102 may determine that a request for the TType was received and/or that the TType may be transmitted.

Representative Use of Physical Layer Resources for ACK/Indication

One or more sets of resources may be configured, provided, and/or used.

A set of resources, for example time and/or frequency resources, may be configured for, associated with, and/or used for any of: (1) a transmission (e.g., a TType or a transmission associated with a TType); (2) a transmission (e.g., a TType) request; (3) a transmission (e.g., a TType) acknowledgement; and/or (4) an upcoming transmission of a TType, among others.

A configuration and/or association may be provided (e.g., by an eNode-B 160) and/or received by a WTRU 102, for example via higher layer signaling (e.g., RRC signaling), broadcast signaling, and/or system information, among others. The signaling may be WTRU-specific, cell specific, and/or specific to a beam and/or direction, among others.

A set of resources may be located in a control channel region and/or a data channel region of a time period such as a slot or timeslot, a mini-slot, a subframe, or a TTI. A set of resources may occupy one or more symbols.

A set of resources may be used in at least some time periods. One or more time periods in which the resources may be used may be aperiodic. One or more time periods in which the resources may be used may be set and/or established according to a configuration that may be received by a WTRU 102 (e.g., from an eNode-B 160). One or more time periods in which the resources may be used may be set and/or established according to a schedule that may be configured and/or known.

Request-resources may be resources (e.g., time and/or frequency resources) that may be used for a request such as a request for a TType (e.g., a request for transmission of, according to, or associated with a TType). A WTRU 102 may transmit the request (e.g., to an eNode-B 160) on and/or using the request-resources. An eNode-B 160 may receive the request (e.g., from the WTRU 102) on and/or using the request-resources.

ACK-resources may be resources (e.g., time and/or frequency resources) that may be used for transmitting and/or receiving an ACK and/or an indication. An eNode-B 160 may transmit an ACK and/or an indication on and/or using the ACK-resources. A WTRU 102 may receive an ACK and/or an indication (e.g., from an eNode-B 160) on and/or using the ACK-resources.

For example, a WTRU 102 may monitor a set of ACK-resources to receive an ACK and/or an indication, for example for a TType. The WTRU 102 may determine that a request for the TType was received and/or that the TType may be transmitted when (e.g., on condition that) the WTRU 102 receives an ACK and/or an indication on the monitored ACK-resources. The WTRU 102 may receive the TType, for example based on, as a result of, and/or after receiving the ACK and/or the indication.

For example, a WTRU 102 may receive (e.g., may need to receive or may intend to receive) a TType. The WTRU 102 may transmit a request for the TType, for example using request-resources. The request-resources may be associated with and/or configured for the TType. In certain representative embodiments, the WTRU 102 may, for example before or instead of requesting the TType, determine whether a request was already made (e.g., by another WTRU 102) and/or acknowledged. A WTRU 102 may determine that one or more TTypes have been requested and/or acknowledged. A WTRU 102 may not transmit a request for a TType that the WTRU 102 determines to have been requested and/or acknowledged.

A WTRU 102 may monitor a set of ACK-resources that may be associated with a TType, for example to receive an ACK for the TType. An ACK may be indicated by a set of bits that may have a configured or known value such as all ones. A WTRU 102 may monitor a set of ACK-resources (e.g., for a TType) according to any of: (1) a configured and/or a known schedule and/or availability (e.g., for the ACK-resources); (2) a configured and/or known schedule and/or availability (e.g., for request-resources that may be for the TType); and/or (3) a time relationship between request-resources and ACK-resources where the time relationship may be configured, indicated, and/or known, among others.

For example, request-resources (e.g., associated with a TType) may be configured, available and/or used in a time or time period n (e.g., slot, timeslot, mini-slot, subframe or TTI n). An ACK and/or an indication may be transmitted, monitored, and/or received in ACK-resources in a time or time period n+k where k may be configured, indicated, and/or known.

Although various embodiments are shown with regard to multicast communications, these embodiments may be implemented with broadcast communications, in lieu of or in addition to the multicast communications.

Representative Duration of On-Demand Transmission

In certain examples, it may be useful for a WTRU 102 to know how long a requested or on-demand transmission may be present and/or repeated. For example, a WTRU 102 may miss a first transmission. It may be useful to know when to expect a repetition, for example to avoid making a new request unnecessarily.

A broadcast or MT such as a SI transmission may be transmitted in response to a request for the transmission. The transmission may occur during a transmission period for example: an upcoming transmission period or a next transmission period following any of: (1) a request and/or (2) a page that may indicate that the transmission may occur in an upcoming transmission period or a next transmission period.

In certain examples, a transmission that may be a requested transmission may begin in transmission period T1. The transmission may be transmitted one or more times during transmission period T1. The number of times that the transmission may be transmitted (and/or may be repeated) in a transmission period (e.g., transmission period T1) may be Ntx and may be set and/or established according to the transmission's schedule. The schedule for a transmission may be fixed, configured, or otherwise known. For example, a SIB transmission may have a schedule that may be fixed (e.g., by specification) or configured, for example by any of: (1) a channel (e.g., a physical broadcast channel (PBCH), among others), (2) a MIB, and/or (3) another SIB, among others.

A WTRU 102 may determine the schedule of a broadcast transmission (e.g., a SIB transmission) and/or a MT, for example, from a configuration that the WTRU 102 may receive from any of: (1) a channel, (2) a MIB, and/or (3) a SIB (e.g., another SIB), among others.

When a transmission that may be requested may begin, may occur, begins, and/or occurs in a transmission period (e.g., transmission period T1), one or more (e.g., all) of the scheduled repetitions of the transmission may be transmitted in the transmission period (e.g., transmission period T1). For example, a WTRU 102 may assume, expect, determine and/or know that at least some (e.g., all) of the repetitions (e.g., scheduled or configured repetitions) of the transmission may be transmitted in the transmission period. The number of repetitions (e.g., Ntx) that may be transmitted may be configured. A WTRU 102 may receive the configuration via signaling, for example via broadcast signaling.

In certain examples, a transmission that may be a requested transmission may begin in transmission period T1. The transmission may be transmitted (e.g., repeated) one or more times. The number of times that the transmission may be transmitted (or repeated) from a first time it is transmitted to a last time it is transmitted, for example for a certain on-demand activation, may be referred to as Nt. Nt (e.g., the value of Nt) may be configured and/or signaled. A value of Nt may be configured for and/or apply to one or more on-demand activations. The actual transmission may be set and/or established according to the schedule of the transmission. The schedule of a transmission may be fixed, configured, or otherwise known. The Nt transmissions may span one or more transmission periods.

When a transmission that may be requested may begin, may occur, begins, or occurs in a transmission period (e.g., transmission period T1), the transmission may be repeated in Ntp transmission periods (e.g., a total of Ntp transmission periods), for example in transmission periods T1, T2, . . . TNtp. The Ntp transmission periods may or may not be consecutive. The Ntp transmission periods may be set and/or established according to a schedule, a cycle, and/or a pattern that may be signaled and/or configured. The number of transmission periods Ntp may be configured, for example via signaling such as via broadcast signaling.

The value or values of Ntx, Nt, and/or Ntp for a transmission may be included in a DCI (e.g., a paging DCI) and/or a paging message. For example, the value or values of Ntx, Nt, and/or Ntp for a transmission may be included in a paging DCI and/or a paging message that may indicate that the transmission may be made in a transmission period such as an upcoming transmission period or a next transmission period.

A transmission period (e.g., transmission period T, T1, T2, among others) may be represented in time units such as frames, subframes, timeslots, slots, mini-slots, seconds, and/or milliseconds, among others.

The number of transmission periods in which a transmission may be repeated Ntp may be indicated by and/or determined from a repetition cycle configuration. For example, a transmission period (e.g., an SI modification period) may be determined from a cycle such as a DRX cycle and/or a paging cycle (e.g., a default paging cycle). In a non-limiting example, a transmission period T may be determined from a multiplier M (e.g., 2) times a cycle C (e.g., 8 frames). For the example, T=2×8=16 frames. A repetition cycle may be determined from a multiplier R (e.g., 4) times a transmission period T. For this example, the repetition cycle=4×T. Ntp may be equal to and/or determined from the repetition cycle.

A WTRU 102 may request a broadcast and/or MT (e.g., a B/M transmission). A WTRU 102 may monitor for and/or receive an indication (e.g., in a paging DCI and/or paging message) of an upcoming B/M transmission (e.g., of the activation or upcoming activation of a B/M transmission). The WTRU 102 may monitor for the B/M transmission in a first transmission period (e.g., the next transmission period, for example according to the schedule of the B/M transmission). The WTRU 102 may monitor for the transmission at a first time the B/M transmission may be transmitted in the first transmission period. If the WTRU 102 does not successfully receive the B/M transmission, the WTRU 102 may monitor for the B/M transmission at a second time the B/M transmission may be transmitted. The second time the B/M transmission may be transmitted may be the next time the B/M transmission may be transmitted in the first transmission period or a first time the B/M transmission may be transmitted in a second transmission period (e.g., the next transmission period). The WTRU 102 may use one or more of: (1) Ntx (e.g., the value of Ntx), (2) Nt (e.g., the value of Nt), (3) Ntp (e.g., the value of Ntp), and/or (4) the B/M transmission schedule to determine the second time when the B/M transmission may occur.

FIG. 10 is a diagram of a representative procedure for reception of on-demand broadcast/multicast (B/M) transmission.

Referring to FIG. 10, the representative procedure 1000 may include, at block 1005, the WTRU 102 receiving a configuration, a schedule and/or parameters (e.g., a broadcast and/or multicast (B/M) transmission configuration, schedule and/or parameters), for example, including the number of repetitions in a transmission period (e.g., Ntx), the number of times that the transmission may be transmitted (e.g., Nt), e.g., for an activation, and/or the number of transmission periods (e.g., Ntp), among others. At block 1010, the WTRU 102 may request a B/M transmission. At block 1015, the WTRU 102 may receive a page indicating a B/M transmission and/or a B/M transmission activation. At block 1020 from either block 1010 or block 1015, the WTRU 102 may wait and/or delay, for example, until the first transmission period (tx period). At block 1025, the WTRU 102 may monitor for and/or receive a B/M transmission in the transmission period, for example according to or based on a schedule (e.g., a predetermined, determined, configured, and/or signaled schedule). At block 1030, the WTRU 102 may determine whether the B/M transmission is received (e.g., successfully received and/or has a verified CRC check). At block 1035, on condition that the B/M transmission is not received (e.g., successfully received), the WTRU 102 may determine whether the transmission is the last expected transmission (e.g., based on one or more parameters received or configured at block 1005). At block 1040, on condition that the B/M transmission is received (e.g., successfully received), processing may end or the WTRU 102 may acknowledge (e.g., via a B/M transmission acknowledgement to a network entity) the successful B/M transmission. At block 1045, on condition that the B/M transmission is the last expected transmission (for example the number of transmissions has reached the threshold Nt, the number of transmissions in a tx period has reached the threshold Ntx and/or the transmissions (e.g., all transmissions) associated with the transmission periods threshold Ntp have been reached), processing may end or the WTRU 102 may: (1) transmit a negative acknowledge (NACK) (e.g., via a B/M transmission acknowledgement to the network entity) for the unsuccessful B/M transmission and/or (2) re-request the B/M transmission. At block 1050, on condition that the transmission is not the last expected transmission, the WTRU 102 may determine a time for the next B/M transmission based on the transmission period, and/or schedule (e.g., Ntx, Nt and/or Ntp), among others. At block 1055, the WTRU 102 may monitor for and/or receive the B/M transmission at the determined time and processing may return to block 1030.

For CE mode operations in which transmissions may be repeated to provide coverage enhancement, the numbers described herein may refer to sets of repeated transmissions. For example, if the number of repetitions for a transmission when using CE is Cl, then Ntx may refer to the number of times a set of Cl transmissions (e.g., corresponding to the same initial transmission) is repeated, e.g., in a transmission period. Nt may refer to the number of times a set of Cl transmissions is repeated.

Although the procedures/operations shown in the FIGs. generally provide details associated with a WTRU, one of skill in the art understands that a complementary process occurs in one or more network entities which may be in direct or indirect communication with the WTRU. For example, an eNode-B or a gNB may be in communication (e.g., direct communication) with the WTRU to implement the procedures/operations associated with the disclosure herein.

Representative Consideration for Beamformed System

One or more of the following may be made or done on a beam, beam-pair (e.g., beam-pair link), and/or beam group basis: request for a transmission or a TType, paging, monitoring for a page, transmission (e.g., a B/M transmission and/or a TType), reception of a transmission, activation of a transmission, acknowledging a request for a transmission or for a TType, and/or configuration of a schedule and/or parameters, among others.

For example, an eNode-B 160 or another network entity may transmit and/or broadcast/multicast via a beam, beam-pair and/or beam group any of: (1) a page; (2) an activation of a B/M transmission; (3) a B/M transmission and/or a TType; (4) a configuration of a schedule and/or of one or more parameters (e.g., B/M parameters); and/or (5) an ACK or indication, e.g., in response to a request for a transmission and/or a TType, among others.

As other examples, a WTRU 102 may monitor for and/or receive via a beam, beam-pair and/or beam group any of: (1) a page; (2) an activation of a B/M transmission; (3) a transmission (e.g., a B/M transmission and/or a TType); (4) a configuration of a schedule and/or one or more parameters (e.g., B/M parameters); and/or (5) an ACK or indication, e.g., in response to a request for a transmission or a TType, among others.

In other examples, a WTRU 102 may transmit and/or an eNode-B 160 or another network entity may receive via a beam, beam-pair and/or beam group any of: (1) a request for a transmission (e.g., a B/M transmission) or a TType and/or (2) an ACK or NACK for a B/M transmission or a TType, among others.

Figure 11:
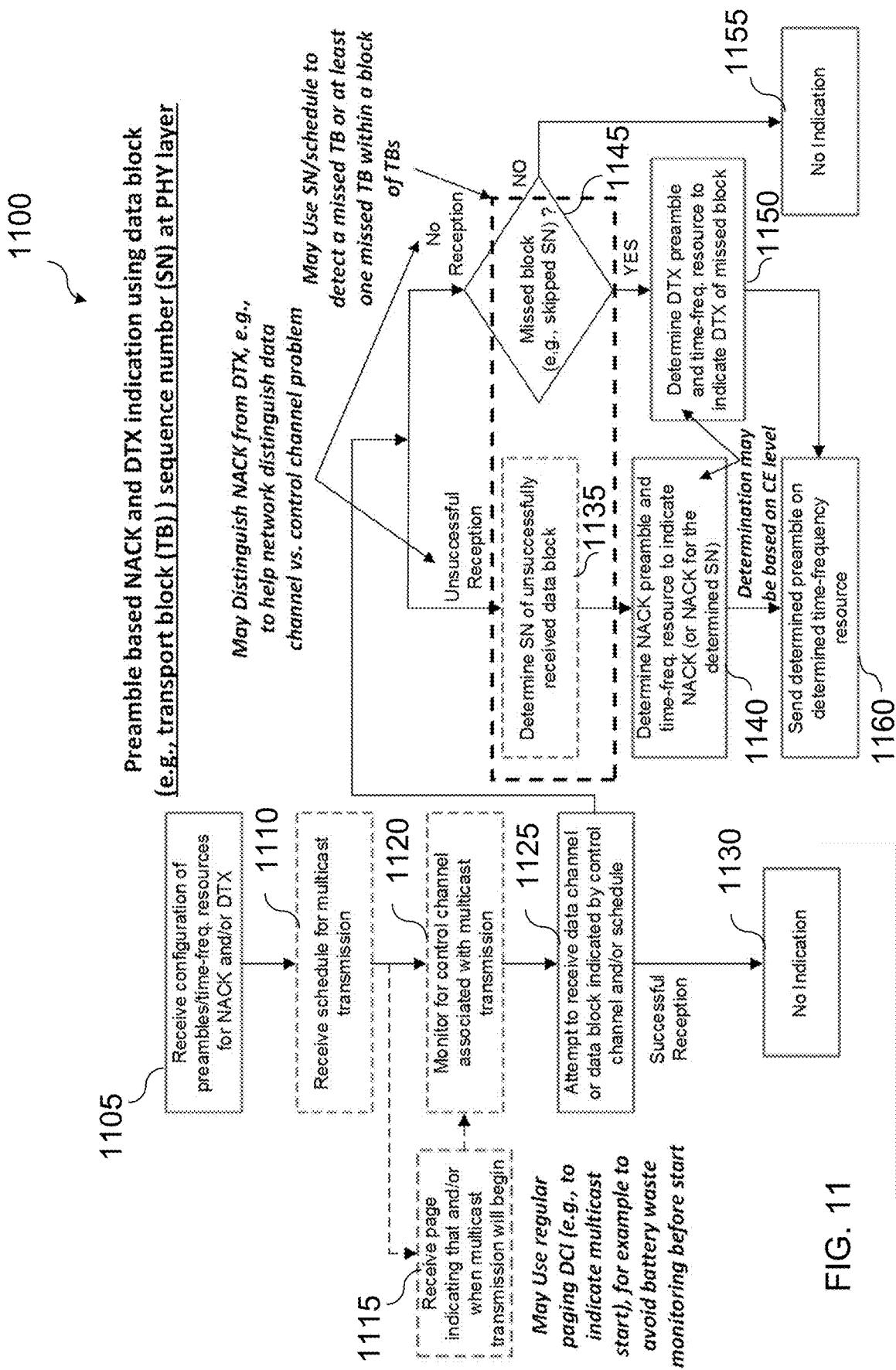
FIG. 11 is a diagram illustrating an example of a preamble based NACK and/or DTX indication.

FIG. 11 is a diagram illustrating an example of a preamble based NACK and/or DTX indication operation.

Referring to FIG. 11, the preamble based NACK and/or DTX indication operation 1100 may include, at block 1105, the WTRU 102 receiving a configuration (e.g., of one or more preambles and/or TF resources that may be used for NACK and/or DTX). At block 1110, the WTRU 102 may receive a schedule for a broadcast or multicast (B/M) transmission. At block 1115, the WTRU 102 may receive a page indicating that (and/or when) the B/M transmission will or is to start or begin. For example, a network entity (e.g., an eNode-B or gNB) may provide and/or use a paging (e.g., regular paging) downlink control information (DCI) (e.g., to indicate a start of a transmission such as a B/M transmission or an upcoming B/M transmission), for example to avoid battery drain/waste due to monitoring of a control or data channel before the start of the transmission. At block 1120, the WTRU 102 may monitor for the control channel (e.g., and/or an appropriate signal) associated with the B/M transmission. At block 1125, the WTRU 102 may attempt to receive the data channel and/or the data block/data blocks indicated by the control channel, the appropriate signal and/or the schedule. At block 1130, on condition that the WTRU 102 received (e.g., successfully received) the control channel and/or data block/data blocks, processing may end (e.g., no ACKs or NACKs may be sent/indicated by the WTRU 102 to the network, for example a network entity).

On condition that the WTRU 102 received (e.g., unsuccessfully received) the control channel and/or data block/data blocks, at block 1135, the WTRU 102 may determine the one or more SNs of the unsuccessfully received data block/data blocks. At block 1140, the WTRU may determine the NACK preamble and/or one or more TF resources to indicate a NACK (or the NACK for the determined one or more SNs).

On condition that the WTRU 102 did not receive (e.g., has no reception of) the control channel or the data block/data blocks, at block 1145, the WTRU 102 may determine the one or more SNs associated with one or more missed data blocks (e.g., skipped SNs associated with missed data blocks).

In certain representative embodiments, the WTRU 102 may distinguish a NACK indication from a DTX indication (e.g., using predetermined, configured, or signaled preambles and/or preamble types and/or TF resources). For example, a network entity may determine, configure, and/or signal that a first set of preambles and/or TF resources may be associated with a DTX indication and a second set of preambles and/or TF resources may be associated with a NACK indication.

In certain representative embodiments, the WTRU 102 may distinguish a NACK indication for a particular SN from a NACK indication for another SN using different preambles and/or TF resources (e.g., predetermined, configured and/or signaled). For example, a network entity may determine, configure and/or signal that a first preamble and/or a first subset of TF resources of a set of preambles and/or TF resources may be associated with a first SN for the NACK indication and a second preamble and/or a second subset of TF resource of the set of preambles and/or TF resources may be associated with a second SN for the NACK indication.

In certain representative embodiments, the WTRU 102 may distinguish a DTX indication for a particular SN from a DTX indication for another SN using different preambles and/or TF resources (e.g., predetermined, configured and/or signaled). For example, a network entity may determine, configure and/or signal that a first preamble and/or a first subset of TF resources of a set of preambles and/or TF resources may be associated with a first SN for the DTX indication and a second preamble and/or a second subset of TF resources of the set of preambles and/or TF resources may be associated with a second SN for the DTX indication.

In certain representative embodiments, at blocks 1135 and 1145, the WTRU may use one or more SNs and/or a schedule (e.g., the transmission schedule such as the B/M transmission schedule) to detect a missed transport block (TB) or at least one missed TB within a block or set of TBs.

On condition that the WTRU 102 determines that there are one or more missed blocks (e.g., one or more missed or skipped SNs), at block 1150, the WTRU may determine a DTX preamble and/or one or more TF resources to indicate the DTX of the one or more missed blocks.

On condition that the WTRU 102 determines that there are no missed blocks, at block 1155, processing may stop at block 1155 (e.g., the WTRU may not provide a NACK indication or a DTX indication).

Processing may move from either block 1140 or block 1150 to block 1160 and the WTRU 102 may send the determined preamble on the determined TF resource or resources. In certain representative embodiments, the determination of the preamble and/or the TF resources may be based on the CE level.

FIG. 12 is a diagram illustrating a representative method of managing a multicast communication to a multicast group implemented by a respective WTRU 102 of WTRUs 102 in the multicast group.

Referring to FIG. 12, the representative method 1200 may include, at block 1210, the respective WTRU 102 of the multicast group receiving a configuration. The configuration may indicate a PRACH preamble to use for a NACK response to a MT to the respective WTRU 102. At block 1220, the respective WTRU 102 may monitor for data of the MT. At block 1230, the respective WTRU 102 may determine whether the monitored for data was successfully received. On condition that the monitored for data was not successfully received, at block 1240, the respective WTRU 102 may send the preamble (e.g., a PRACH preamble or a sequence (e.g., one sequence of a set of orthogonal sequences) indicated by the received configuration.

Although the use of PRACH preambles is disclosed herein, in various embodiments, it is understood by one of ordinary skill in the art that other preambles (e.g., sequences, for example orthogonal sequences which are known to the transmitter and receiver) are possible and as such PRACH preambles are only one non-limiting example. In certain representative embodiments, the preambles may be PRACH preambles or other types of preambles. In certain representative embodiments, the preambles may be sequences, for example orthogonal sequences that may be configured and/or known.

In certain representative embodiments the preambles may be PRACH preambles or sequences, RACH preambles or sequences and/or random access preambles or sequences. PRACH and RACH may be used interchangeably herein. PRACH preamble, RACH preamble and random access preamble may be used interchangeably herein.

In certain representative embodiments, the received configuration may further indicate TF resources to be used for sending the PRACH preamble and/or the sending of the PRACH preamble may include sending the PRACH preamble using the TF resources indicated in the received configuration.

In certain representative embodiments, the data may be obtained from a set of one or more data blocks and/or the WTRU 102 may determine whether any one respective data block of the monitored for data was not successfully received based on an error checking operation associated with the respective data block.

In certain representative embodiments, the data may be obtained from a set of one or more data blocks and/or on condition that a respective data block (e.g., each respective data block) of the monitored for data was successfully received based on a cyclic redundancy check (CRC) of the respective data block, the WTRU 102 may provide the data obtained from the set of data blocks of the MT to a higher layer.

In certain representative embodiments, the data may be obtained from a set of one or more data blocks and the WTRU 102 may determine which one or which ones of the set of one or more data blocks of the monitored for data were not successfully received. For example, the sending of the PRACH preamble indicated by the received configuration may include the WTRU 102 sending the PRACH preamble that may correspond to, indicate, or include an indication of the data block or the data blocks of the monitored for data that were not successfully received.

In certain representative embodiments, the WTRU 102 may determine (e.g., via the physical layer) a sequence number for each data block not successfully received. For example, the WTRU 102 may determine, using the determined sequence numbers, one or more sequence numbers associated with a missing and/or skipped data block or missing and/or skipped data blocks, as a missing or skipped sequence number or missing or skipped sequence numbers.

In certain representative embodiments, the WTRU 102 may send the PRACH preamble that may correspond to, indicate, or include an indication of the missing or skipped sequence number or missing or skipped sequence numbers.

In certain representative embodiments, the WTRU 102 may determine a CE level associated with at least one of the WTRU 102, the monitored data, and/or the transmission of the PRACH preamble. For example, the WTRU 102 may determine the PRACH preamble and/or PRACH TF resource according to the determined CE level.

In certain representative embodiments, the configuration may indicate a set of one or more PRACH preambles and/or a set of one or more TF resources to be used for sending the one or more PRACH preambles.

In certain representative embodiments, the WTRU 102 may: (1) select one PRACH preamble from the set of one or more PRACH preambles and at least one TF resource of the set of one or more TF resources based on any of: (i) a portion of the MT not being successfully received; and/or (ii) a CE level; and/or (2) send the selected preamble using the selected at least one TF resource.

In certain representative embodiments, the WTRU 102 may receive a schedule for the MT; and/or on condition that the WTRU 102 is in idle mode, may wake up based on the received schedule to monitor for the data of the MT.

FIG. 13 is a diagram illustrating a representative method of managing a multicast communication of a multicast group including a plurality of WTRUs.

Referring to FIG. 13, the representative method 1300 may include, at block 1310, a network entity (NW) (e.g., an eNode-B 160, a gNB, and/or another network entity, among others) that may establish the multicast group. At block 1320, the NW (e.g., e-Node-B 160) may send to the multicast group, a configuration. For example, the configuration may indicate a PRACH preamble to use for a NACK response to a MT from the NW 160.

In certain representative embodiments, the NW 160 may: (1) send to the multicast group, the MT; (2) receive, from a respective WTRU 102, the PRACH preamble indicated by the sent configuration (e.g., on condition that monitored for data of the MT was not successfully received by the respective WTRU 102 of the multicast group), and (3) retransmit a portion or all of the MT. For example, the sent configuration may indicate one or more TF resources to be used for receiving the PRACH preamble such that the NW 160 may receive the PRACH preamble on at least one of the TF resources indicated in the sent configuration. For example, the received PRACH preamble and/or the one or more TF resources used for receiving the preamble may correspond to, indicate, or include an indication of one or more data blocks which were not successfully received by a respective WTRU 102; and the retransmission of the MT may include retransmission of the one or more data blocks of the MT indicated by the PRACH preamble received from the respective WTRU 102 and/or indicated by the one or more TF resources used for receiving the preamble.

In certain representative embodiments, the NW 160 may: (1) establish one or more data blocks associated with data of the MT; and/or (2) send each respective data block of the one or more data blocks with a respective sequence number that is associated with the respective data block.

In certain representative embodiments, on condition that the NW 160 receives one or more PRACH preambles after retransmitting the MT, the NW 160 may further retransmit at least a portion of the MT; and on condition that the NW 160 does not receive any PRACH preambles after retransmitting or further retransmitting the MT, the NW 160 may stop any further retransmissions and/or portions of the retransmissions of the MT.

In certain representative examples, the data of the MT may be obtained from a set of one or more data blocks such that the NW 160 may: receive the PRACH preamble including an indication (e.g., an implicit indication based on the PRACH preamble itself and/or the TF resource(s) on which the preamble was received) of the data block or the data blocks of the monitored for data that were not successfully received; and may retransmit the data block or data blocks indicated by the received PRACH preamble and/or the TF resource(s) on which the preamble was received.

In certain representative embodiments, the NW 160 (e.g., at a physical layer and/or a higher layer) may: determine a sequence number for each data block indicated by the received PRACH preamble and/or TF resources on which the preamble was received; and retransmit the data block or data blocks indicated by the determined sequence number or sequence numbers.

In certain representative embodiments, the data of the MT may be obtained from a set of one or more data blocks.

In certain representative embodiments, the NW 160 may: receive the PRACH preamble including an indication of a CE level associated with (1) the WTRU 102 from which the preamble was received; (2) reception of the preamble; and/or (3) one or more of the data blocks of the set of one or more data blocks. The indication of the CE level may be implicit (e.g., indicated by the preamble itself or by the TF resources on which the preamble is received). The NW 160 may retransmit the data block or data blocks indicated by the received PRACH preamble and/or the TF resources used for the preamble reception in accordance with the indicated CE level from the received PRACH preamble.

In certain representative embodiments, the NW 160 may send a schedule for the MT to the multicast group to adjust a sleep mode of one or more WTRUs 102 in the multicast group. A start time to send the MT may be based on the schedule sent.

FIG. 14 is a diagram illustrating a representative method, implemented by a NW, of managing a multicast communication of a multicast group including a plurality of WTRUs.

Referring to FIG. 14, the representative method 1400 may include, at block 1410, a network entity (NW) (e.g., an eNode-B 160. a gNB, and/or another network entity, among others) that may establish the multicast group. At block 1420, the NW (e.g., e-Node-B 160) may send to the multicast group, one or more configurations, each configuration indicating a set of one or more PRACH preambles and a set of one or more TF resources to be used for receiving the PRACH preamble from a respective WTRU 102. At block 1430, the NW 160 may send to the multicast group, the MT. At block 1440, the NW 160 may monitor for preambles based on the set of one or more PRACH preambles and the set of one or more TF resources indicated in the one or more configurations. At block 1450, on condition that one or more monitored for preambles are received, the NW 160 may retransmit a portion or portions of the MT.

In certain representative embodiments, the NW 160 may determine, based on the preambles received and the TF resources used for carrying the preambles received, (1) the portion or the portions of the MT to be retransmitted; and/or (2) one or more CE levels of the portion or portions of the MT to be retransmitted.

FIG. 15 is a diagram illustrating a representative method of configuring a WTRU.

Referring to FIG. 15, the representative method 1500 may include, at block 1510, a WTRU 102 that may send to a NAP (e.g., an eNode-B 160. a gNB, and/or another network entity that may enable access to the network, among others), a PRACH preamble indicating to provide System Information (SI) to the WTRU 102. At block 1520, the WTRU 102 may monitor for the SI responsive to receipt by the NAP 160 of the PRACH preamble. At block 1530, the WTRU 102 may configure itself using a received SI.

In certain representative embodiments, the WTRU 102 may receive the SI via any of: (1) a broadcast of the SI; (2) a multicast of the SI; and/or (3) a unicast of the SI.

In certain representative embodiments, the WTRU 102 may indicate or send a CE level associated with the WTRU

102. For example, the WTRU 102 may monitor for the SI a number of transmission times in accordance with the sent CE level.

In certain representative embodiments, the WTRU 102 may send a transmission request including the PRACH preamble on a first set of TF resources, different from TF resources of a random access channel.

In certain representative embodiments, the WTRU 102 may send a TType or use the PRACH preamble to indicate the TType to request the SI be communicated via the sent or indicated TType as one of: (1) a broadcast transmission, (2) a MT and/or (3) a dedicated transmission, among others.

In certain representative embodiments, on condition that the WTRU 102 does not receive a response to the transmission request, the WTRU 102 may perform any of: (1) sending another transmission request including a TType; (2) sending some or all the other transmission requests in accordance with the TType; (3) increasing power and sending the other transmission request; (4) setting a CE level higher and sending the other transmission request; and/or (5) setting the higher CE level and receiving a transmission in accordance with the TType.

In certain representative examples, the WTRU 102 may receive and/or determine a CE level associated with the WTRU 102 based on any of: (1) a measurement or reception of a channel and/or (2) a maximum CE level supported in a cell.

In certain representative embodiments, the WTRU 102 may receive control information including a transmission indication that the SI information is to be transmitted in an upcoming transmission. For example, the transmission indication may include any of: (1) an indication that a portion of the SI is to be transmitted in an upcoming transmission period; (2) an indication that a portion of the SI is to be updated; and/or (3) an unchanged value tag indicating that the SI or a portion of the SI (e.g., to be transmitted or expected to be transmitted) is unchanged from a last transmission of the SI. In certain representative embodiments, the unchanged SI may be transmitted and in other representative embodiments, the unchanged SI is not transmitted (e.g., the unchanged SI or portion of the SI is skipped with regard to its transmission).

FIG. 16 is a diagram illustrating a representative method of configuring a respective WTRU in a paging mode.

Referring to FIG. 16, the representative method 1600 may include, at block 1610, a WTRU 102 that may receive from a NAP 160 (e.g., an eNode-B 160) during a paging occasion, a page indicating an upcoming transmission of the SI or another B/M transmission (e.g., an upcoming transmission of a SW download or update) associated with a multicast group of WTRUs 102 including the respective WTRU 102 and/or some or all WTRUs 102. At block 1620, the respective WTRU 102 may receive and/or decode the SI or other B/M transmission (e.g., one or more data blocks or transport blocks of the SI or B/M transmission). At block 1630, the WTRU 102 may configure itself using the received and/or decoded SI or other B/M transmission.

FIG. 17 is a diagram illustrating a representative method, implemented by a NAP for serving a plurality of WTRUs.

Referring to FIG. 17, the representative method 1700 may include, at block 1710, a NAP 160 that may receive from one or more of the plurality of WTRUs 102, a PRACH preamble common to the plurality of WTRUs 102 to indicate to provide SI to the plurality of WTRUs 102. At block 1720, the NAP 160 may send to one or more of the plurality of WTRUs 102, the SI, responsive to receiving, by the NAP 160 the common PRACH preamble.

In certain representative embodiments, the NAP 160 may send the SI via any of: (1) a broadcast; (2) a multicast; and/or (3) a unicast.

In certain representative embodiments, the NAP 160 may send an indication of a CE level that indicates the number of repetitions of a transmission of the SI for the plurality of WTRUs 102.

In certain representative embodiments, the NAP 160 may repeatedly send the SI (e.g., may send the SI with a number of repetitions) based on any of: (1) a received CE level; (2) a CE level associated with a highest number of repetitions from among a set of received CE levels; (3) a highest CE level supported by the NAP 160 or in a cell; and/or (4) a predetermined number of repetitions.

In certain representative embodiments, the NAP 160 may receive a transmission request including the common PRACH preamble on a first set of TF resources, which is associated with the plurality of WTRUs 102, the first set of TF resources being different from TF resources of a random access channel (RACH). The NAP 160 may also receive a second transmission request including a second common PRACH preamble on a second set of TF resources, different from the first TF resources and the time-frequency resources of the RACH.

In certain representative embodiments, the NAP 160 may receive a TType or use the PRACH preamble to indicate the TType to request the SI be communicated via the received or indicated TType as one of: (1) a broadcast transmission, (2) a MT and/or (3) a dedicated transmission. For example, the NAP 160 may communicate the SI via the received or indicated TType.

In certain representative embodiments, the NAP 160 may receive or determine a CE level associated with the WTRU 102 based on any of: (1) a measurement or reception of a channel and/or (2) a highest or maximum CE level supported in a cell.

In certain representative embodiments, the NAP 160 may send control information including a transmission indication that the SI information is to be transmitted in an upcoming transmission. For example, the transmission indication may include any of: (1) an indication that a portion of the SI is to be transmitted in an upcoming transmission period; (2) an indication that a portion of the SI is to be updated; and/or (3) an indication that the SI remains unchanged from a last transmission of the SI.

FIG. 18 is a diagram illustrating a representative method of reception of an on-demand broadcast and/or multicast (B/M) transmission implemented by a WTRU.

Referring to FIG. 18, the representative method 1800 may include, at block 1810, a WTRU 102 that may receive a B/M transmission configuration. For example, the B/M transmission configuration may indicate one or more B/M parameters for the reception of the on-demand B/M transmission. At block 1820, the WTRU 102 may send a request for the on-demand B/M transmission. At block 1830, the WTRU 102 may monitor for the requested B/M transmission in a transmit period. At block 1840, the WTRU 102 may determine whether the monitored for B/M transmission was successfully received. At block 1850, on condition that the monitored for B/M transmission was not successfully received, the WTRU 102 may determine whether the monitored for B/M transmission was a last expected B/M transmission based on the one or more B/M parameters indicated in the B/M transmission configuration. At block 1860, on condition that the monitored for B/M transmission was not the last expected B/M transmission, the WTRU 102 may determine a time for a next B/M transmission based on the one or more B/M parameters indicated in the B/M transmission configuration. At block 1870, the WTRU 102 may monitor for the next B/M transmission at the determined time. At block 1880, the WTRU 102 may determine whether the monitored for next B/M transmission was successfully received. At block 1890, on condition that the monitored for next B/M transmission was successfully received, the WTRU 102 may decode the next B/M transmission.

In certain representative embodiments, on condition that the monitored for B/M transmission was the last expected B/M transmission, The WTRU 102 may send a NACK response or a further request for the on-demand B/M transmission.

In certain representative embodiments, the WTRU 102 may determine whether any of: (1) a number of transmissions of the B/M transmission reached a first threshold; (2) a number of transmissions of the B/M transmission in the transmit period reached a second threshold; and/or (3) a number of transmit periods for the B/M transmission reached a third threshold. For example, the first threshold, the second threshold and/or the third threshold may be based on one or more of the B/M parameters included in the B/M transmission configuration.

In certain representative embodiments, the WTRU 102 may send a PRACH preamble, as the NACK response.

In certain representative embodiments, the received B/M configuration may indicate a schedule for the B/M transmission.

In certain representative embodiments, the WTRU 102 may receive: (1) a page indicating any of: a B/M transmission is to be sent and/or a B/M transmission activation (e.g., prior to the sending of the request for the on-demand B/M transmission).

In certain representative embodiments, on condition that the WTRU 102 is in an idle mode, the WTRU 102 may receive: (1) a page indicating any of: a B/M transmission is to be sent and/or a B/M transmission activation (e.g., prior to the sending of the request for the on-demand B/M transmission).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein, are provided below with respect to FIGS. 1-5.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc."

is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group and/or set having 1-3 cells refers to groups/sets having 1, 2, or 3 cells. Similarly, a group/set having 1-5 cells refers to groups/sets having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU 102 may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method implemented by a wireless transmit/receive unit (WTRU), the method comprising:
    receiving downlink control information (DCI) during a paging occasion;
    determining that the DCI or a message in a data channel scheduled by the DCI indicates an activation of a multicast transmission of a first type;
    on condition that the activation of the multicast transmission of the first type is indicated, sending a connection request; and
    receiving the multicast transmission of the first type.

2. The method of claim 1, wherein the connection request is a Radio Resource Control (RRC) connection request or the resume request is a RRC resume request.

3. The method of claim 1, wherein the connection request or the resume request includes a request cause associated with multicast transmission.

4. The method of claim 1, further comprising receiving configuration information indicating timing information or scheduling information associated with the multicast transmission of the first type.

5. The method of claim 4, wherein the receiving of the multicast transmission of the first type is in accordance with the information indicated in the received configuration information.

6. The method of claim 4, wherein the received configuration information is received via Radio Resource Control (RRC) signaling.

7. The method of claim 1, further comprising, prior to a page monitoring operation, sending a Non-Access Stratum (NAS) message indicating interest in the multicast transmission of the first type.

8. The method of claim 1, wherein:
    the DCI is associated with a paging operation; and
    the receiving of the DCI occurs while the WTRU is in a non-connected mode, the non-connected mode being different from either a connected mode or an idle mode.

9. The method of claim 8, comprising:
    determining that the DCI or a message in a data channel scheduled by the DCI indicates an activation of a multicast transmission of a second type; and on condition that the activation of the multicast transmission of the second type is indicated, remaining in the non-connected mode.

10. The method of claim 1, further comprising establishing a connection to a network, wherein the receiving of the multicast transmission of the first type occurs after the WTRU is connected to the network.

11. The method of claim 1, wherein:
the DCI includes a system information update indication; and
on condition that the system information update indication indicates an update of the system information block (SIB), receiving the updated SIB.

12. A wireless transmit/receive unit (WTRU), comprising:
a transmit/receive unit configured to receive downlink control information (DCI) during a paging occasion; and
a processor configured to determine that the DCI or a message in a data channel scheduled by the DCI indicates an activation of a multicast transmission of a first type,
wherein the transmit/receive unit is configured to:
on condition that the activation of the multicast transmission of the first type is indicated, send a connection request, and
receive the multicast transmission of the first type.

13. The WTRU of claim 12, wherein the connection request is a Radio Resource Control (RRC) connection request or the resume request is a RRC resume request.

14. The WTRU of claim 12, wherein the connection request or the resume request includes a request cause associated with multicast transmission.

15. The WTRU of claim 12, wherein the transmit/receive unit is configured to receive configuration information indicating timing information or scheduling information associated with the multicast transmission of the first type.

16. The WTRU of claim 15, wherein the transmit/receive unit is configured to receive the multicast transmission of the first type in accordance with the timing or scheduling information indicated in the received configuration information.

17. The WTRU of claim 15, wherein the received configuration information is received via Radio Resource Control (RRC) signaling.

18. The WTRU of claim 12, wherein the transmit/receive unit is configured to send, prior to a page monitoring operation, a Non-Access Stratum (NAS) message indicating interest in the multicast transmission of the first type.

19. The WTRU of claim 12, wherein:
the DCI is associated with a paging operation; and
the transmit/receive unit is configured to receive the DCI while in a non-connected mode, the non-connected mode being different from either a connected mode or an idle mode.

20. The VVTRU of claim 19, wherein:
the processor is configured to determining that the DCI or a message in a data channel scheduled by the DCI indicates an activation of a multicast transmission of a second type; and
on condition that the activation of the multicast transmission of the second type is indicated, the WTRU is configured to remain in the non-connected mode.

21. The WTRU of claim 12, wherein:
the processor is configured to establish a connection to a network; and
the transmit/receive unit is configured to receive the multicast transmission of the first type after the WTRU is connected to the network.

22. The WTRU of claim 11, wherein:
the DCI includes a system information update indication; and
the transmit/receive unit is configured to receive, on condition that the system information update indication indicates an update of a system information block (SIB), the updated SIB.

* * * * *

UNITED STATES PATENT AND TRADEMARK OFFICE
CERTIFICATE OF CORRECTION

PATENT NO. : 11,818,073 B2
APPLICATION NO. : 17/350844
DATED : November 14, 2023
INVENTOR(S) : Janet A Stern-Berkowitz and Moon-il Lee It is certified that error appears in the above-identified patent and that said Letters Patent is hereby corrected as shown below:

In the Claims

1. At Column 55, Line 12, Claim 11: After "an update of", replace "the" with --a--
2. At Column 55, Line 25, Claim 12: After "a connection request", insert --or a resume request--
3. At Column 56, Line 17, Claim 20: Replace "VVTRU" with --WTRU--

Signed and Sealed this
Twelfth Day of March, 2024

Katherine Kelly Vidal
*Director of the United States Patent and Trademark Office*